US012731131B2

(12) United States Patent
Witchey et al.

(10) Patent No.: US 12,731,131 B2
(45) Date of Patent: Sep. 8, 2026

(54) MANAGING DIGITAL LEDGERS VIA DIGITAL TOKENS, SYSTEMS, METHODS, AND APPARATUS

(71) Applicant: Nant Holdings IP, LLC, Culver City, CA (US)

(72) Inventors: Nicholas J. Witchey, Laguna Hills, CA (US); Patrick Soon-Shiong, Los Angeles, CA (US)

(73) Assignee: Nant Holdings IP, LLC, Culver City, CA (US)

( * ) Notice: Subject to any disclaimer, the term of this patent is extended or adjusted under 35 U.S.C. 154(b) by 0 days.

(21) Appl. No.: 19/353,319

(22) Filed: Oct. 8, 2025

(65) Prior Publication Data

US 2026/0037960 A1 Feb. 5, 2026

Related U.S. Application Data

(63) Continuation of application No. 18/745,826, filed on Jun. 17, 2024, now Pat. No. 12,475,451, which is a continuation of application No. 18/232,707, filed on Aug. 10, 2023, now Pat. No. 12,093,929, which is a continuation of application No. 18/131,809, filed on Apr. 6, 2023, now Pat. No. 11,880,824.

(51) Int. Cl.
*G06Q 20/36* (2012.01)
*G06Q 20/10* (2012.01)

(52) U.S. Cl.
CPC ......... *G06Q 20/3672* (2013.01); *G06Q 20/10* (2013.01); *G06Q 2220/00* (2013.01)

(58) Field of Classification Search
CPC .................... G06Q 20/00–425; H04L 9/00–50
See application file for complete search history.

(56) References Cited

U.S. PATENT DOCUMENTS

| | | | | |
|---|---|---|---|---|
| 11,348,152 | B1 * | 5/2022 | Davis | G06Q 30/0601 |
| 2020/0273048 | A1 * | 8/2020 | Andon | G06Q 10/02 |
| 2023/0104103 | A1 * | 4/2023 | Eby | H04L 9/50 705/69 |
| 2024/0289779 | A1 * | 8/2024 | Shetti | G06Q 20/065 |

* cited by examiner

*Primary Examiner* — Ari Shahabi
(74) *Attorney, Agent, or Firm* — Kilpatrick Townsend & Stockton LLP

(57) ABSTRACT

Techniques include receiving a request to instantiate a layered notarized software architecture and instantiating a plurality of software layers in memory. The techniques further include generating a digital token on a primary ledger representing at least one software layer in the plurality of software layers. The techniques further include instantiating a target ledger associated with the at least one software layer and with the digital token, and instantiating at least one smart contract associated the target ledger and representing the at least one software layer. The techniques further include instantiating at least one data monitoring agent associated with the at least one software layer. The techniques further include enabling recording transactions associated with the at least one software layer via the at least one data monitoring agent.

21 Claims, 14 Drawing Sheets

Block 302

Hash of Prior Blocks 304

Time Stamp 306

Smart Contract(s) 308

Transaction(s) Data 310

Hash of Current Block 312

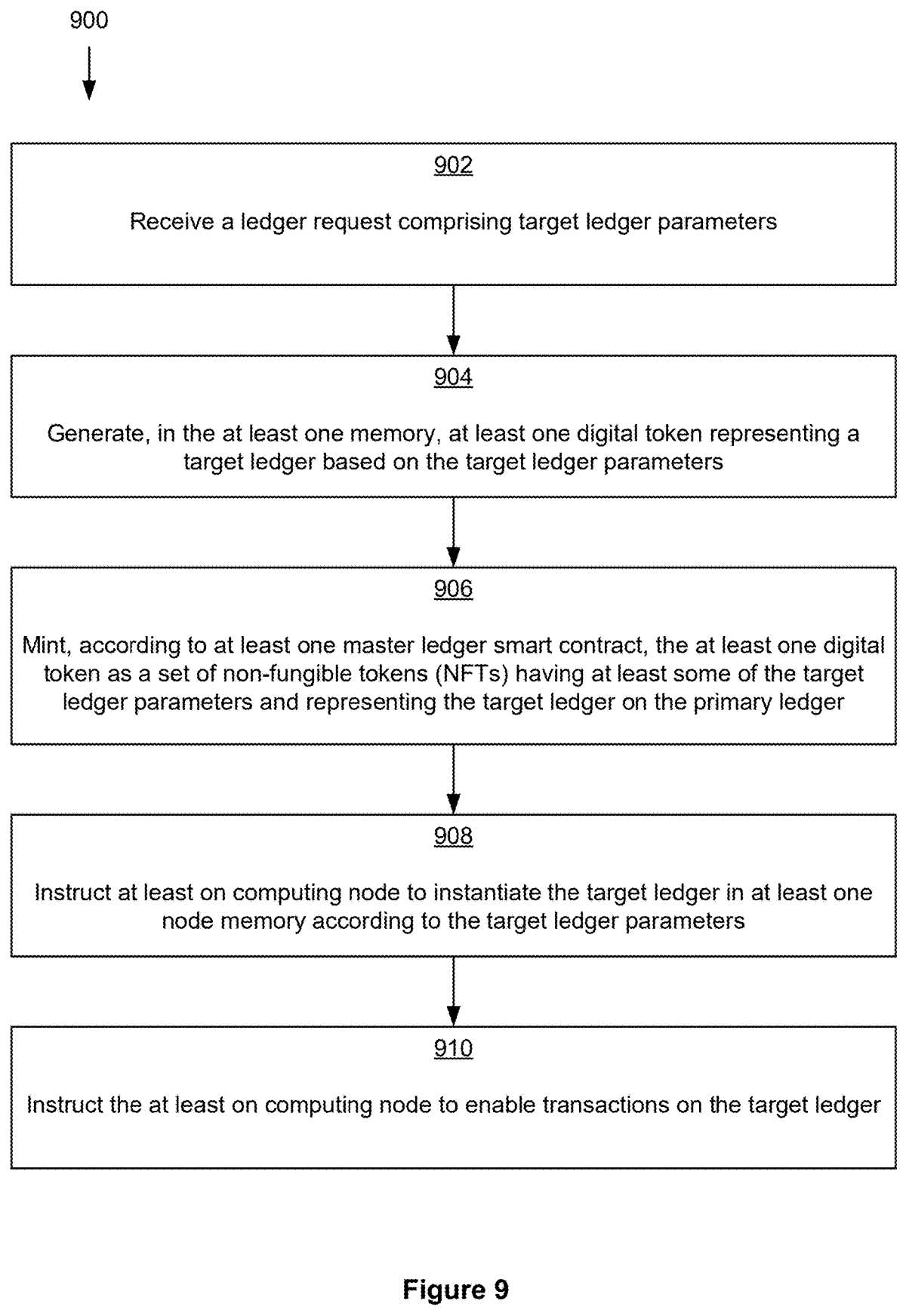

Receive a ledger request comprising target ledger parameters

904

Generate, in the at least one memory, at least one digital token representing a target ledger based on the target ledger parameters

906

Mint, according to at least one master ledger smart contract, the at least one digital token as a set of non-fungible tokens (NFTs) having at least some of the target ledger parameters and representing the target ledger on the primary ledger

908

Instruct at least on computing node to instantiate the target ledger in at least one node memory according to the target ledger parameters

910

Instruct the at least on computing node to enable transactions on the target ledger

Figure 9

MANAGING DIGITAL LEDGERS VIA DIGITAL TOKENS, SYSTEMS, METHODS, AND APPARATUS

CROSS-REFERENCE TO RELATED APPLICATION

This application is a continuation application of U.S. application Ser. No. 18/745,826, filed Jun. 17, 2024, and entitled "Managing Digital Blockchains Via Digital Tokens, Systems, Methods, and Apparatus," which is a continuation application of U.S. application Ser. No. 18/232,707, filed Aug. 10, 2023, and entitled "Managing Digital Blockchains Via Digital Tokens, Systems, Methods, and Apparatus," which is a continuation application of U.S. application Ser. No. 18/131,809, filed Apr. 6, 2023, and entitled "Managing Digital Blockchains Via Digital Tokens, Systems, Methods, and Apparatus," the contents of which are herein incorporated by reference in its entirety for all purposes.

FIELD OF THE INVENTION

The field of the invention generally relates to managing notarized ledgers (e.g., blockchains, distributed ledger, etc.) as an asset through the use of a digital token such as a Non-Fungible Token (NFT).

BACKGROUND

The background description includes information that may be useful in understanding the present inventive subject matter. It is not an admission that any of the information provided herein is prior art or applicant admitted prior art, or relevant to the presently claimed inventive subject matter, or that any publication specifically or implicitly referenced is prior art or applicant admitted prior art.

By way of introduction, a blockchain represents blocks of data that are linked together via cryptography technology. Each block includes, among other things, data and a cryptographic hash of a previous block. The cryptographic hash serves as a link to the previous block. As such, the blocks form a chain of blocks (e.g., a blockchain) linked via cryptographic hash. The data in each block is secured (e.g., against unauthorized modifications, etc.) because any change alters all subsequent blocks. Generally, a distributed computing architecture is used to manage the blockchain. This architecture can involve multiple computer nodes. Each computer node can store a block of the blockchain, and the computer nodes implement one or more protocols to communicate and validate blocks.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the inventive subject matter and does not pose a limitation on the scope of the inventive subject matter otherwise claimed. No language in the specification should be construed as indicating any non-claimed element essential to the practice of the inventive subject matter.

Groupings of alternative elements or embodiments of the inventive subject matter disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be understood that many of the foundational technical features provided in the following specification are presented to enable compact examination of the disclosed inventive subject matter. While some of the foundational technical features described herein may seem obscure, in many cases such features may be considered within the scope of understanding of one skilled in the art. Thus, presentation of such background technologies should not be considered limiting.

SUMMARY

The inventive subject matter provides apparatuses, systems, and methods in which a target ledger is managed on a primary ledger.

Some characteristics of blockchains as they are currently used are problematic for certain use cases and could be improved. Blockchains may have trouble allowing users to treat ledgers and the data therein as assets. Embodiments described herein address these problems, and others.

In an embodiment, at least one processor performs instructions to receive a ledger request comprising target ledger parameters, generate in the at least one memory, at least one digital token representing a target ledger based on the target ledger parameters, mint according to at least one primary ledger smart contract, the at least one digital token as set of NFTs having at least some of the target ledger parameters and representing the target ledger on the primary ledger, instruct at least one computing node to instantiate the target ledger in at least one node memory according to the target ledger parameters, and instruct the at least one computing node to enable transactions on the target ledger.

Embodiments allow for a target ledger to be recorded as a digital token on a primary ledger. Thus, NFTs are capable of being used to record transactions associated with an update of a target ledger and may allow for ledgers and the data included therein to be treated as assets. Accordingly, representing a target ledger with one or more NFTs allows and/or improves the capability of a ledger and/or the data therein to have ownership, have value, be verifiably authentic, and/or implement access control.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

FIG. 3 illustrates a block diagram of a blockchain block according to an embodiment, in accordance with the present disclosure.

FIG. 9 shows a flow diagram illustrating a method utilized by a computer-based digital notarized ledger management system, in accordance with the present disclosure.

DEFINITIONS

Figure 1:
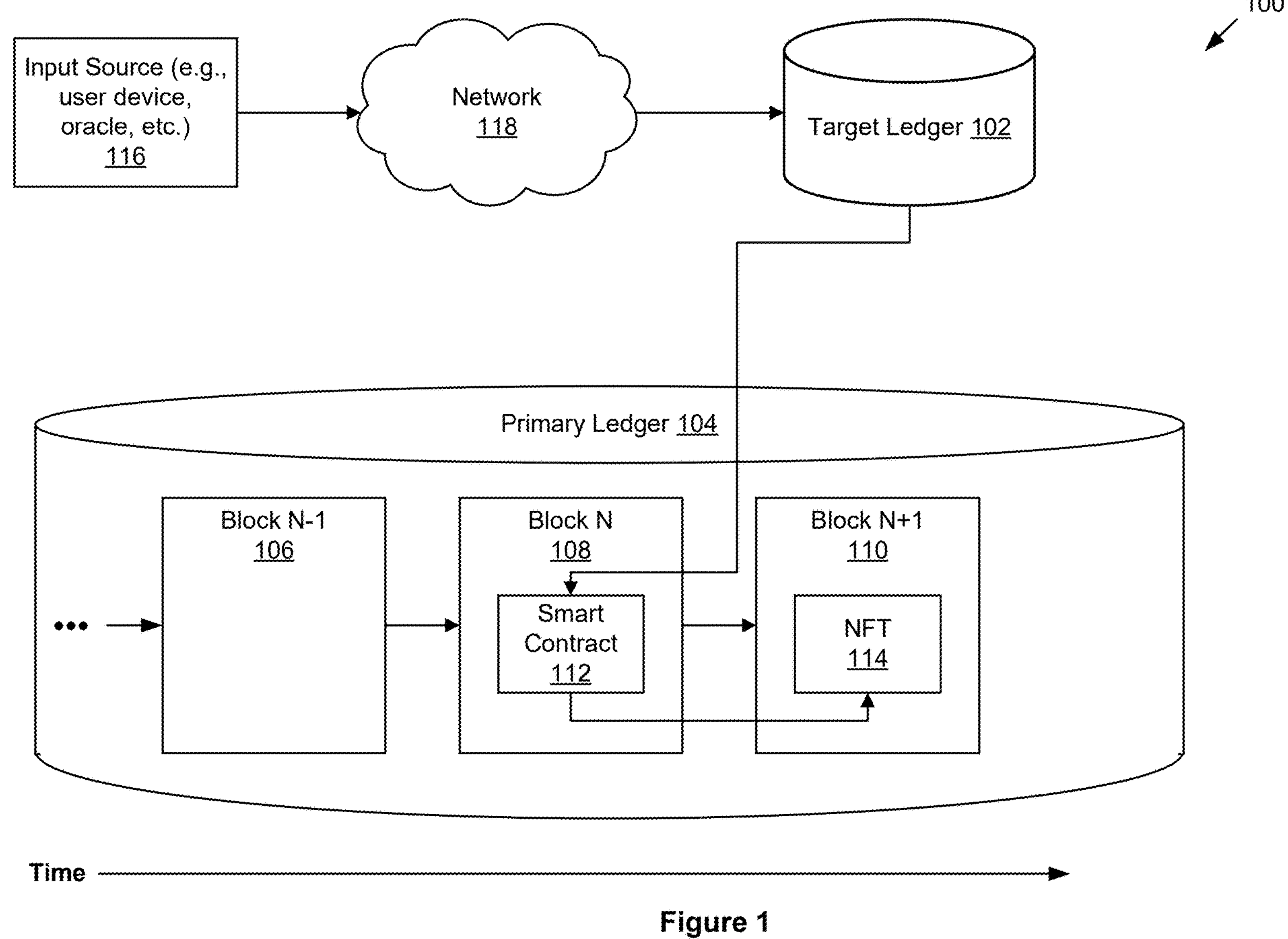
FIG. 1 illustrates a block diagram of a system according to an embodiment, in accordance with the present disclosure.

A "blockchain" or "ledger" can be a distributed/decentralized database that maintains a continuously growing list of records secured from tampering and revision. A blockchain can be an NFT blockchain, a cryptocurrency blockchain, or a combination thereof. A blockchain may include a number of blocks of interaction records. Each block in the blockchain can include a timestamp and a link to a previous block. Stated differently, interaction records in a blockchain may be stored as a series of "blocks," or permanent files that include a record of a number of interactions occurring over a given period of time. Blocks may be appended to a blockchain by an appropriate node after it completes the block and the block is validated. Each block can be associated with a block header. In embodiments of the invention, a blockchain may be distributed, and a copy of the blockchain may be maintained at each full node in a verification network. Any node within the verification network may subsequently use the blockchain to verify interactions. A blockchain can be stored, maintained, and updated in a distributed manner in a peer-to-peer network. For example, in a cryptocurrency application, such as Bitcoin or Ethereum, Ripple, Dash, Litecoin, Dogecoin, zCash, Tether, Bitcoin Cash, Cardano, Stellar, EOS, NEO, NEM, Bitshares, Decred, Augur, Komodo, PIVX, Waves, Steem, Monero, Golem, Stratis, Bytecoin, Ardor, or in digital currency exchanges, such as Coinbase, Kraken, CEX.IO, Shapeshift, Poloniex, Bitstamp, Coinmama, Bisq, LocalBitcoins, Gemini and others where the distributed ledger represents each transaction and where units of the cryptocurrency are transferred between entities.

An "oracle" is a means for smart contracts to access data from the world outside of a blockchain (off-chain). Oracles are a type of smart contract that takes data from the world not accessible by the respective blockchain and puts it into the blockchain for other smart contracts to use.

An "NFT" is a non-fungible token. NFTs serve as a unique digital identifier that is recorded on a blockchain and used to certify ownership and authenticity. NFTs can be created or instantiated (i.e., typically called "minting"), bought, sold, auctioned, burned, or otherwise managed as digital objects. Management of NFTs can be achieved through use of existing of smart contracts that follow token standards such as via Ethereum smart contract standards. The Ethereum smart contract ecosystem has multiple standards by which tokens may be managed including ERC-20, which represents fungible tokens; cryptocurrency coins for example. ERC-721 defines interfaces by which one may manage NFTs via smart contracts. According to ERC-721 transactions relating to an NFT (e.g., minting, transfers, burning, etc.) are recorded on the Ethereum blockchain to retain a ledger of all desired actions associated with the NFT. Further ERC-998 defines interfaces for creating tokens comprising sub-tokens and vice versa. Yet further, ERC-1155 defines interfaces by which one can create token sets. As individuals interact with Ethereum tokens via one or more transactions, the transactions are recorded on the Ethereum blockchain thereby forming an immutable ledger of the existence of such tokens. One should appreciate that Ethereum is used as an example. Each ledger may comprise its own NFT standard interfaces via which the ledger-specific NFTs may be managed. Further, the following discussion references use of NFTs; however, use of other types of ledger-based tokens may also be leveraged with the inventive subject matter. For example, a composable token (i.e., ERC-998 like token) may represent an entire ledger-based application stack where each token (e.g., NFT, ERC-1155-like, etc.) in the composable token corresponds to a layer or feature in the stack.

A "wallet address" uniquely identifies a ledger account. Tokens can be "stored" in the wallet of entity or person and retrieved for future use. A wallet can comprise more than one address of an account. Thus, a wallet could have multiple addresses associated with the corresponding ledger technology where each address could operate as token owner identifier. Example wallet address types include P2PKH address, P2SH address, Bech32 address, portion of a 256-bit hash, GUID, UUID, custom address (e.g., 512-bit hash, etc.) etc.

DETAILED DESCRIPTION

The present application relates to using a primary ledger to manage one or more target ledgers. Embodiments included herein allow for a blockchain/ledger to be treated like an asset. While the term "blockchain" is used for illustrative purposes, one should appreciate the inventive subject matter is not so limited and may be applied to other forms of notarized ledgers as discussed further below.

It should be noted that any language directed to a computer should be read to include any suitable combination of computing devices, including servers, interfaces, systems, databases, agents, peers, engines, controllers, modules, or other types of computing devices operating individually or collectively. One should appreciate the computing devices comprise at least one processor configured to execute software instructions stored on a tangible, non-transitory computer-readable storage medium (e.g., hard drive, FPGA, PLA, solid state drive, RAM, flash, ROM, etc.). The software instructions or suite of software instructions configure or program the computing device or their processors to provide the roles, responsibilities, or other functionality as discussed below with respect to the disclosed apparatus or systems. Further, the disclosed technologies can be embodied as a computer program product that includes a non-transitory computer-readable medium storing the software instructions or a suite of software instructions that cause one or more processors to execute the disclosed steps associated with implementations of computer-based algorithms, processes, methods, or other instructions. In some embodiments, the various servers, systems, databases, or interfaces exchange data using standardized protocols or algorithms, possibly based on HTTP, HTTPS, TCP, UDP, FTP, SNMP, IP, AES, public-private key exchanges, web service or RESTful APIs, known financial operation protocols, or other electronic information exchanging methods. Data exchanges among devices can be conducted over a packet-switched network, the Internet, LAN, WAN, VPN, or other type of packet switched network; a circuit switched network; cell switched network; or other type of network, wired or wireless.

As used in the description herein and throughout the claims that follow, when a system, engine, server, agent, device, module, or other computing element is described as configured to perform or execute functions on data in a memory, the meaning of "configured to" or "programmed to" is defined as one or more processors or cores of the computing element being programmed by a set of software instructions stored in the memory of the computing element to execute the set of functions on target data or data objects stored in the memory. It should be appreciated the combination of software and hardware working in concert create a dedicated set of physical, real-world structures that provide utility to one or more users that would not exist outside the scope of the physical, real-world assets.

Techniques are described that enable a target ledger to be represented by a digital token. In the interest of clarity of explanation, a non-fungible token (NFT) is used as an example in embodiments of the present disclosure. However, the embodiments are not limited as such and similarly and equivalently apply to other types of digital tokens. Further, the described techniques enable a primary ledger to facilitate the management of the target ledger by way of the NFT (or, similarly, the digital token).

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

Examples herein are directed to among other things, systems and methods relating to using a computer-based primary ledger to manage a computer-based target ledger.

In an example system, a computer-based digital notarized ledger management system comprises at least one computer readable memory storing a primary notarized ledger and software instructions (e.g., smart contracts, node instructions, etc.). The system further comprises at least one processor coupled with the at least one memory, the processor performs operations upon executing the software instructions. The at least one processor performs instructions to receive a ledger request comprising target ledger parameters, generate in the at least one memory, at least one digital token representing a target ledger based on the target ledger parameters, mint according to at least one primary ledger smart contract, the at least one digital token as set of NFTs having at least some of the target ledger parameters and representing the target ledger on the primary ledger, instruct at least one computing node to instantiate the target ledger in at least one node memory according to the target ledger parameters, and instruct the at least one computing node to enable transactions on the target ledger.

An example embodiment comprises a computer-based digital notarized ledger management system, the system comprising: at least one computer readable memory storing a primary notarized ledger and storing software instructions; at least one processor coupled with the at least one memory and that performs the following operations upon execution of the software instructions: receive a target ledger management request comprising management parameters and a target ledger identifier; identify, based at least in part the target ledger identifier, at least one NFT on a primary ledger and representing a target ledger; and instruct at least one computing node associated with the primary ledger to invoke a smart contract transaction associated with the at least one NFT according to the management parameters.

In an embodiment of the present invention, a computer-based digital token management system, comprises: at least one computer readable memory storing a digital notarized ledger, a digital token associated with the digital notarized ledger, and storing software instructions; wherein the digital token comprises a token owner identifier have a first portion representing an owner of the digital token and a second, different portion representing a state of the digital token; and at least one processor coupled with the at least on memory and that performs the following operations upon execution of the software instructions: receive a request to update the digital token, the request comprising digital token owner data and a digital token state data; identify the digital token based a comparison of the digital token owner data with the first portion of the token owner identifier; generate a new token owner identifier for the digital token wherein at least the second portion is updated based on the digital token state data; and invoke a smart contract on a computing node of the notarized ledger associated with the digital token according the new token owner identifier.

Embodiments allow for NFTs to be used to record transactions associated with an update of a target ledger. Further, embodiments described herein at least allow for ledgers and the data included therein to be treated as assets by using digital tokens, such as NFTs, to manage a ledger that the NFT is contained on, or a different ledger. Thus, benefits such as representing the ownership, value, authenticity, and access rights of a ledger are made capable by embodiments described herein.

Turning now to the figures, FIG. 1 illustrates a block diagram of a system according to an embodiment. The system in FIG. 1 includes an input source 116, a network 118, a target ledger 102, a primary ledger 104, a smart contract 112, and an NFT 114. The system also includes blockchain blocks 106, 108, and 110. In the interest of clarity of explanation, a blockchain is described in various embodiments of the present disclosure. However, the embodiments are not limited as such. Instead, the embodiments similarly apply to other types of digitally distributed, decentralized, ledgers that can record a set of digital tokens. Further, embodiments may apply to other notarized ledgers that chronicle information that is immutable or nearly immutable.

Target ledger 102 and primary ledger 104 are both blockchain ledgers for illustrative purposes. By their nature, the ledgers are considered immutable (notarized). Further, ledgers are often distributed. Given the distributed nature of ledgers, in an embodiment, at least one processor coupled with at least one computer readable memory storing a primary notarized ledger 104 operates as a member node of a plurality of primary ledger 104 computing nodes. The primary ledger 104 may be a smart contract ledger, a financial ledger, a currency ledger, a healthcare ledger, a gaming ledger, a licensing ledger, a legal ledger, a storage ledger, a version control ledger, a supply chain ledger, or any other type of purpose-built or application-specific ledger. The target ledger 102 may also be any of the above-listed types of ledgers, or other unlisted ledger type. Further, the primary ledger 104 may be implemented using a public ledger, a distributed ledger, a custom ledger, a hash graph, a directed acyclic graph, a centralized ledger, a semi-centralized ledger, a permissioned ledger, or any other ledger-design implementation. Again, the target ledger 102 may also be designed in any of the listed ways in which the primary ledger 104 may be designed. The target ledger 102 may, but need not be, implemented using the same design as the primary ledger 104. Further, the target ledger 102 may, but need not use the same type of ledger as the primary ledger 104. The primary ledger 104 and target ledger 102 could also be built on a ledger such as Hyperledger Fabric, Stellar, Ripple, Klaytn, OpenChain, Hyperledger Iroha, Hyperledger Sawtooth, Corda, Tron, BigChainDB, Ethereum, Solana, Wax, Polygon, Hyperledger, IOTA, Cardano, etc. The primary ledger 104 and target ledger 102, may be, but need not be built on the same ledger infrastructure (e.g., Polygon). In embodiments described herein, the target ledger 102 may be the core asset owned by an entity and that ownership can be represented on the primary ledger 104. In an embodiment, a ledger, such as the target ledger 102 may comprise a torrent ledger where the data of the target ledger 120 may be stored as a torrent.

A target ledger 102 (or any blockchain ledger) may be represented by an object class. An object class, in programming, defines a set of attributes and methods that can be used to create and operate on objects (e.g., ledger objects, block objects, transaction objects, etc.). Key elements of a blockchain may be represented by an object class, such as blocks and transactions. A block object may have attributes such as a block hash, previous block hash, timestamp, list of transaction objects included within the block, and a nonce. A transaction object may have attributes such as a transaction hash, a sender address, a recipient address, an amount, an NFT, and/or a signature. Transaction objects and block objects may then be used to represent the data that is stored on a blockchain, such as a target ledger 102. Possible methods that may be associated with a ledger object could be an addTransaction( ) method, a getBalance( ) method to obtain the balance of a particular wallet address, a validateBlockchain( ) method to iterate through the blocks of the ledger and check that the hash value is correct, a getTransactionHistory( ) method to retrieve a list of all transactions on a ledger or on a ledger and associated with a particular wallet address, a mint( ) method to mint one or more portions of ledger data as an NFT on a primary or target ledger, a rebuild( ) method to rebuild a target ledger with corrected data (e.g., a corrected smart contract or some data removed), createSmartContract( ) method to add a smart contract to a target or primary ledger, a createGenesisBlock( ) method (e.g., the method parameters indicate the structure of the ledger being created, such as if it is to be a chain, a hash graph, or a directed acyclic graph) etc. Blockchain blocks N−1 106, N 108, and N+1 110 included in the primary ledger 104 are shown in the illustrated diagram as part of system 100. For the simplicity of illustration, blocks are not shown to be part of target ledger 102. However, one of ordinary skill in the art would recognize that by the nature of a blockchain ledger, the blockchain ledger (e.g., the target ledger 102, the primary ledger 104) includes one or more blocks and that blocks are added to the blockchain over time. Blocks that can be included in ledgers, such as the primary ledger 104 and the target ledger 102 are discussed in more detail below with respect to FIG. 3. For further simplicity of illustration in system 100 and other systems throughout the disclosure, blocks may not have any components (e.g., transactions, NFTs, smart contracts, etc.) depicted within or may have only a select number of such components depicted within a block. This is not intended to be limiting, instead, it is done for simplicity of illustration. One having ordinary skill in the art would recognize that blocks may include no transactions or a large number of transactions and/or other data.

In some embodiments, either one or both of the primary ledger 104 and the target ledger 102 may include smart contracts and/or support an interface to smart contracts, for example, smart contract 112. Smart contracts exist on a blockchain and allow for one or more outputs to occur as a result of one or more inputs. In an embodiment, input for the smart contract is received from an input source 116 such as a machine (e.g., computer, tablet, smartphone, etc.), an oracle, another smart contract, etc. In an embodiment, smart contract input is received from the output of a smart contract that is operating on the same ledger or a different ledger as the smart contract that is receiving the input. Smart contracts are explained below in more detail with respect to FIG. 4.

In some embodiments, either one or both of the primary ledger 104 and the target ledger 102 may record information associated with one or more NFTs, such as NFT 114. NFTs are explained below in more detail with respect to FIG. 2. An NFT may exist as an asset represented on the primary ledger 104 and the NFT may represent characteristics (e.g., ownership, access rights, changes, versions, ledger state, etc.) of the target ledger 102. In an embodiment, the primary ledger 104 is the main ledger on which the NFT is represented as an asset and the NFT represents the target ledger 102, which typically is a different or distinct ledger. Thus, target ledger 102 may be considered a distinct object or asset from primary ledger 104, where target ledger 102 may be managed via transactions associated with the target ledger's 102 NFT.

A network 118 is also depicted in system 100. One having ordinary skill in the art would recognize that data exchanges among devices can be conducted over a packet-switched network, the Internet, LAN, WAN, VPN, or other type of packet switched network; a circuit switched network; cell switched network; or other type of network, wired or wireless. That is to say, when data is sent from a device to another device (e.g., input source to target ledger, target ledger to primary ledger, primary ledger to target ledger, etc.), one or more other devices may necessarily be used to allow the data to travel to the destination.

Figure 2:
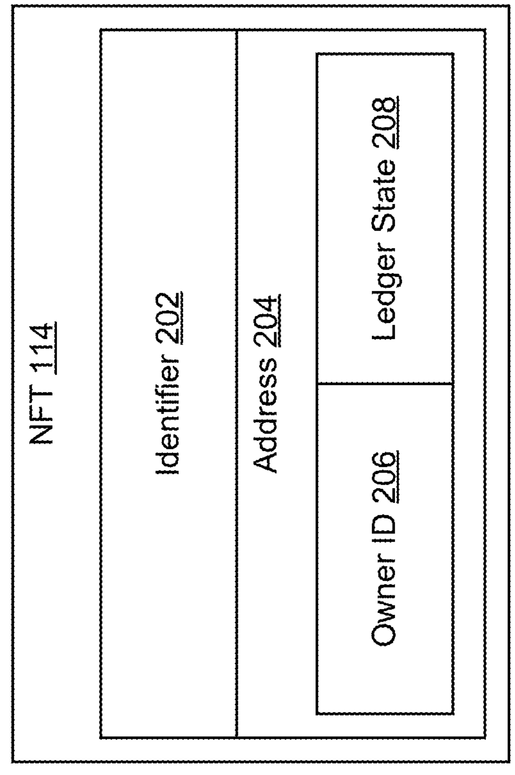
FIG. 2 illustrates a block diagram of a non-fungible token (NFT) according to an embodiment, in accordance with the present disclosure.

Turning now to FIG. 2 which illustrates a block diagram of a non-fungible token (NFT) according to an embodiment.

NFTs may comprise various forms of data to represent an asset. The data included within an NFT 114 may comprise an identifier 202 and/or an address 204. The identifier 202 is typically unique to the ledger that the NFT 114 is minted on. In an embodiment, the NFT 114 identifier 202 is unique across more than one ledger. The identifier 202 may be represented with a hash value, a globally unique identifier (GUID), a universally unique identifier (UUID), a number, a name, 256-bit value, 512-bit value, etc.

The address 204 included within an NFT 114 may be of any practical length. For example, the address 204 length may be 256 bits. In an embodiment, the address 204 represents the unique owner address (e.g., wallet address) associated with an owner of the NFT 114. The bits within the address 204 field of the NFT 114 may represent many different pieces of information or objects, limited only by the size of the bit field. Thus, the inventive subject matter is considered to include extending the functionality of the NFT owner address to include management features via one or more bit fields. In an embodiment, the address 204 field of the NFT 114 is split into two or more separate fields of the same or different sizes so that the allowable size of the NFT 114 address 204 field may represent more than one piece of information. For example, the address 204 field of the NFT 114 may be split into two smaller fields representing an Owner ID 206 and ledger state 208 respectively, with equal sizes of 128 bits. In an embodiment, the owner ID 206 field represents a unique identifier of an owner of the NFT 114 and does not change until the owner of the NFT 114 (or, equivalently in some embodiments, the owner of the target ledger) changes. In an embodiment, the ledger state 208 bit field is updated based on updates or edits related to the ledger (e.g., a block is added to the ledger, transactions are added to the ledger, the ledger is turned on or off, ledger state changes such as a state being created, updated or deleted, etc.). For example, the NFT 114 address 204 bit field may change for an NFT 114 that is recorded on a primary ledger as the target ledger (represented by the NFT 114) adds transactions and/or blocks to the target ledger. By changing the ledger state 208 and/or owner ID 206 bit fields over time, the size of NFT 114 transactions can be reduced which can allow for the reduction of computational strain on the network. Further, in an embodiment a, portion of the address 204 field may be used to store bits useful for a multi-bit search trie. In an embodiment, a multi-bit search trie is used to point to other constructs, lookup tables, etc. and reduce the memory access for the algorithm. In yet another embodiment, select bits in the address 204 bit field may represent an integer, wherein the integer represents the value of a state machine, an index for a lookup table whose cells hold function pointers, additional instructions, next stage in lookup, pointers to other lookup tables, etc. In an embodiment, bits in the address 204 bit field may represent a URL and/or a point/file handle into a file system (e.g., local file system for the target ledger, IPFS, etc.). While the above example provides for splitting address 204 into multiple fields, it is also contemplated that a wallet might have multiple, full address (i.e., a single whole address) fields representing state information beyond mere ownership.

In an embodiment, the complete address 204 bit field or portions of the address 204 bit field are implemented for a healthcare use case. In this use case, the complete address 204 bit field can be constructed as a Health Object Identifier (HOI) with a prefix and a suffix. In an embodiment, a prefix represents a hospital ID, a patient ID, a target ledger, etc. In an embodiment, the suffix represents a specific record identifier, patient-specific record, etc. that was sent previously. Examples of HOIs that may be adapted for use with the inventive subject matter are described in U.S. Pat. No. 11,017,897 to Soon Shiong titled "Healthcare Management Objects," filed as a PCT application Mar. 22, 2012, the content of which is incorporated herein by reference in its entirety.

In an embodiment, the complete address 204 bit field or portions of the address 204 bit field represent a pointer to a block, transaction, data, smart contract, NFT, etc. on a target ledger. The pointer bit field may point directly or indirectly to the target ledger object or objects. Indirect lookups may be achieved through an intermediary lookup (e.g., table, multibit trie, ledger name services, etc.).

In an embodiment, an NFT 114 is a ledger feature NFT and can represent the functionality of the ledger it is represented on, or the functionality of another ledger (e.g., target ledger). In an embodiment, a ledger feature NFT 114 represents at least one of the following functionalities or features: a standardized layer, a monitoring agent, a read interface, a write interface, a cryptographic function, a name service, a ledger object namespace, a ledger object ontology, a healthcare agent, a financial agent, a gaming agent, a cache, a smart contract system, etc. One should appreciate, with the benefit of the present disclosure, that there are other features associated with a ledger that may be represented by an NFT 114. Specifically, any feature that someone might find valuable to pay for or otherwise manage, may be represented and used as a ledger feature NFT 114 to be used with the target ledger. Thus, in an embodiment, an NFT 114 may grant access rights for use of a smart contract on either the primary or target ledger. In an embodiment, the NFT 114 itself represents a smart contract that can be used by the target ledger. In an embodiment, an NFT 114 may represent the ledger it is recorded on (e.g., primary ledger), a separate ledger (e.g., target ledger), portions of either ledger, the objects stored on (or associated with) the target ledger, each block of either ledger, smart contracts on either ledger, smart contract APIs, etc. Thus, the inventive subject matter is considered to include leveraging digital tokens (e.g., NFTs, ledger NFTs, etc.) to manage ledgers as objects, ledger objects, portions of a ledger, or other ledger features. Further, such techniques may be used for creating a self-referential management system where NFTs recorded on a ledger may be used to manage the ledger itself, thereby giving rise to a "reflection" service in the computer science sense for the ledger (see URL en.wikipedia.org/wiki/Reflective_programming for information related to reflective programming).

Figure 3:
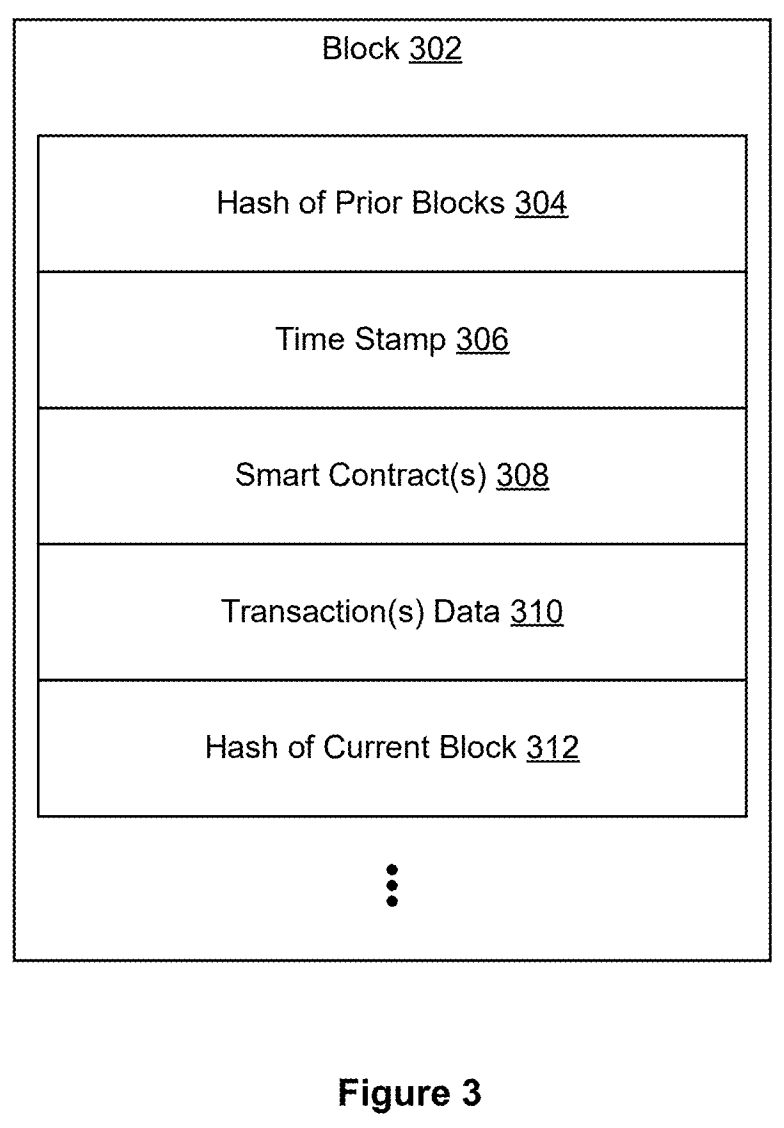

Turning now to FIG. 3 which illustrates a block diagram of a blockchain block according to an embodiment.

Blockchains, or notarized ledgers, are comprised of structured data that are called blocks. A block 302 may include a cryptographic hash (a unique identifier) of the previous block 304 to prevent any block from being altered or the sequence of blocks from being altered. A blockchain is essentially a write-once-at-the-current-block, read-many-blocks type of system. A block 302 can be written to the blockchain, but it may then only be read from, it cannot be altered and preferably represent immutable data. A block 302 may also include a time stamp 306 of when transactions were recorded. Each block 302 may further include a hash of the current block 312, representing the hash value of the block 302 after the block 302 has obtained a batch of valid transactions to be included within the block 302 on the blockchain. Additionally, a block 302 may represent other data such as smart contracts 308 or transaction data 310. A block 302 may include zero or more transactions represented as transaction data 310. Additionally, or alternatively, a block 302 may represent zero or more smart contracts 308. In an embodiment, the number of transactions (represented by transaction data 310) and/or smart contracts 308 that may be associated with block 302 may be limited by the amount of time a block 302 takes to be validated by the network. Further, transaction data 310 in a block 302 may be high level information about the transaction such as that the transaction was a read operation, a write operation, a minting transaction, an update transaction, a version transaction, an upgrade transaction, a ledger-to-ledger transaction, a copy transaction, a move transaction, a burn transaction, an ownership transaction, etc. On the other hand, transaction data 310 in a block 302 may be more specific such as that an NFT transferred ownership or what the NFT data represents. In an embodiment, transaction data 310 of a first size is stored on the blockchain while at least a portion of the transaction data of a second size is stored off of the blockchain because of the attributes the data has (e.g., data size, transaction type, etc.) might not be practical to store on-ledger. In an embodiment, only the high-level transaction data 310 is stored on the blockchain and the high-level information includes a pointer to where the lower-level data is stored (e.g., where the off-chain storage is, IPFS, etc.) off-ledger.

Figure 4:
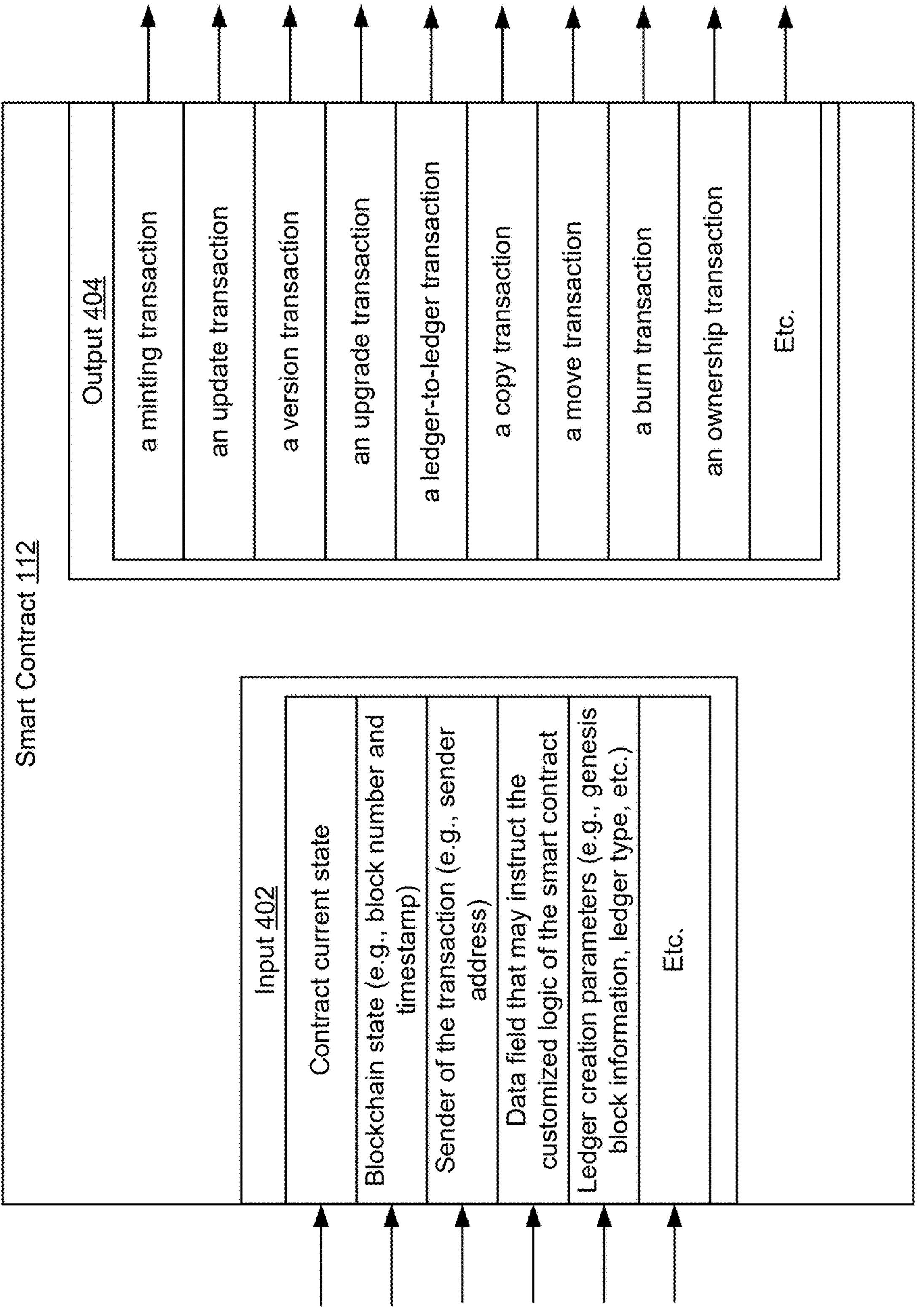
FIG. 4 illustrates a block diagram of a smart contract according to an embodiment, in accordance with the present disclosure.

Turning now to FIG. 4 which illustrates a block diagram of a smart contract 112 according to an embodiment. A smart contract 112 may take one or more inputs 402 and produce one or more outputs 404. Inputs 402 may come from other smart contracts associated with the same blockchain, smart contracts associated with a different blockchain, user devices, oracles, etc., or a combination thereof. Example inputs 402 to a smart contract 112 may be the contract's 112 current state, the blockchain's current state (e.g., block number and timestamp), information about the sender of the transaction (e.g., sender's wallet address), a data field that may instruct the customized logic of the smart contract, ledger creation parameters (e.g., genesis block information, ledger type, observer node identification, consensus mechanism, ledger purpose, etc.), output 404 from one or more other smart contracts, information represented within or pointed to by an NFT, etc. Outputs 404 of a smart contract 112 may create a transaction on a blockchain, change an ownership address of an NFT, mint a transaction, update a transaction, perform a version transaction, perform an upgrade transaction, perform a ledger-to-ledger transaction, perform a copy transaction, perform a move transaction, perform a burn transaction, perform an ownership transaction, etc., or any combination thereof. Further, the output 404 may perform any such actions on the blockchain the smart contract 112 is associated with, or on a different blockchain. Embodiments described herein may use a smart contract 112 that is stored and/or referenced on a blockchain to perform actions on a target blockchain and/or a primary blockchain. An embodiment of the invention can use a single smart contract 112 to receive any defined inputs 402 and produce any defined outputs 404. An embodiment of the invention uses multiple smart contracts 112 to take particular inputs 402 related to a primary ledger/and or target ledger and produce particular outputs 404 related to a target ledger and/or primary ledger.

Byte code of a smart contract 112 may be stored directly within the transaction that is recorded in a block of a ledger. In some embodiments, once a smart contract 112 is deployed, it is stored on one or more nodes that make up a blockchain, and a transaction is recorded within a block of the ledger, the transaction pointing to where the smart contract 112 is stored in memory (e.g., the memory of a blockchain node).

Figure 5:
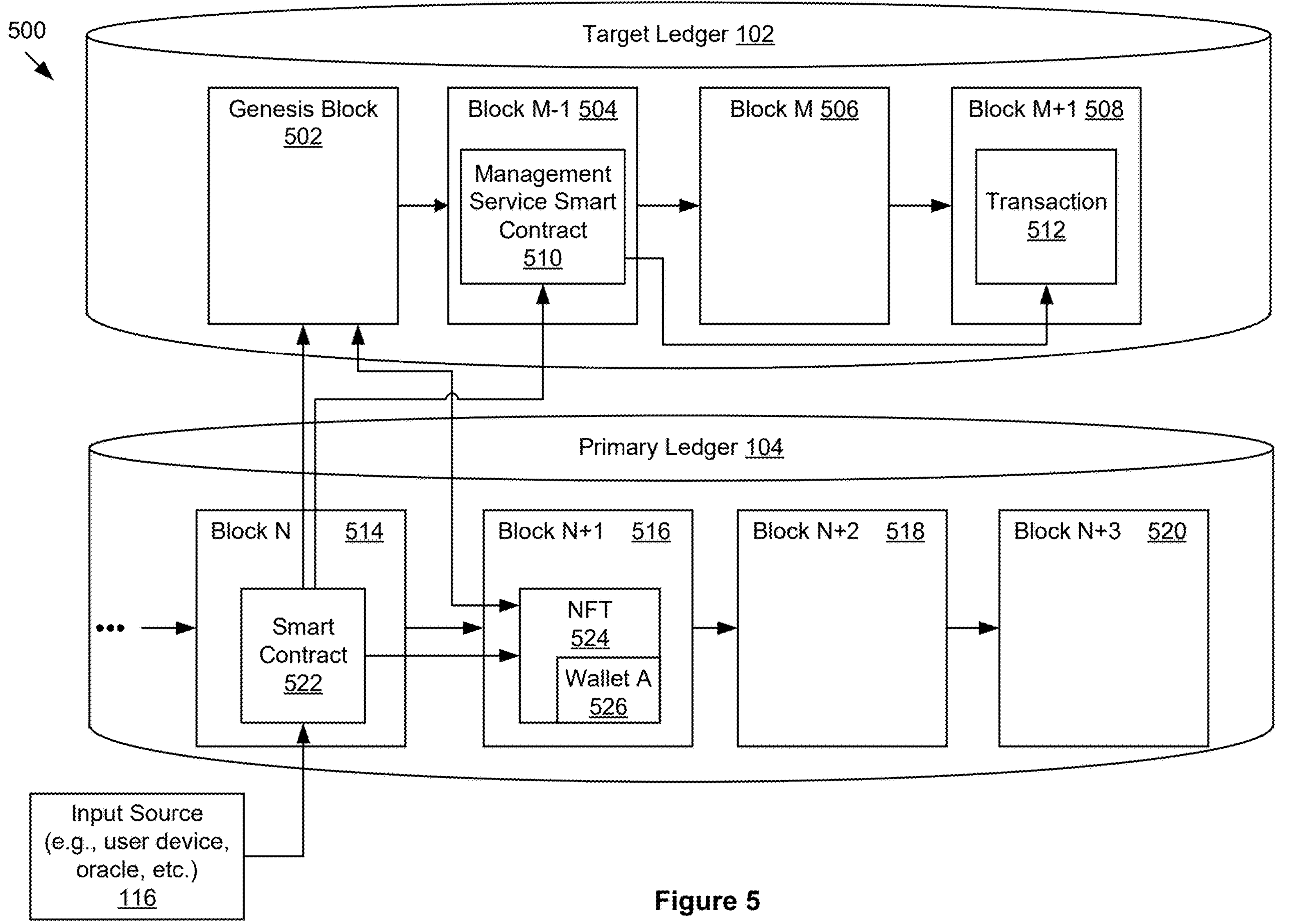
FIG. 5 illustrates a block diagram of a system according to an embodiment, in accordance with the present disclosure.

By using smart contracts to create transactions on a blockchain, change an ownership address of an NFT, mint transactions, update transactions, perform version transactions, perform upgrade transactions, perform ledger-to-ledger transactions, perform copy transactions, perform move transactions, perform burn transactions, perform ownership transactions, etc., NFTs are capable of being used to record transactions associated with an update of a target ledger and manage ledgers as an asset. Turning now to FIG. 5 which illustrates a block diagram of a system according to an embodiment. System 500 depicts a target ledger 102 and a primary ledger 104. Each of the target ledger 102 and the primary ledger 104 may include one or more blocks and the blocks may include any number of smart contracts, transactions, and other data. In the example presented, target ledger 102 is a distinct ledger from primary ledger 104. Thus, primary ledger 104 can be considered a tool for managing target ledger 102 via NFTs and the associated smart contract(s) operating from primary ledger 104.

Although system 500 and other example embodiments are depicted with only one target ledger 102 and one primary ledger 104, some embodiments include more than two ledgers. In an embodiment, a primary ledger 104 has a one-to-many primary-to-target ledger relationship. In an embodiment, the target ledger 102 of a primary ledger 104 may itself be in a primary ledger 104 relationship to a third "sub-target" ledger 102. Therefore, it is possible that many ledgers can be chained together in many different orders to create various primary-target ledger relationship combinations. For example, in an embodiment, there are more than two ledgers in the system, such as ledgers A, B, and C. Ledger A may be in a primary ledger 104 relationship to target ledger 102 B, and ledger B may simultaneously be in a primary ledger 104 relationship to target ledger 102 C, possibly forming a hierarchical relationship (e.g., a tree, etc.) among ledgers. In an embodiment, a primary ledger 104 can have more than one target ledger 102. In an embodiment a ledger B may be a target ledger 102 of a ledger A, a ledger C may be a target ledger 102 of B, and ledger C may simultaneously be a target ledger 102 of A. That is to say, in an embodiment, a primary-target ledger relationship may be made among any set of ledgers, no matter what preexisting primary-to-target ledger relationships each ledger has. In an embodiment, a ledger A can be a primary ledger 104 and a target ledger 102 to a ledger B. Further, in an embodiment, the relationship among ledgers is capable of being represented by an NFT (e.g., an NFT represented on the primary ledger 104 represents ownership of a target ledger 102, an NFT represented on the primary ledger 104 represents the ability of a wallet to perform certain actions corresponding to the target ledger 102, etc.). In such an embodiment, the NFT can represent the relationships that exist between primary 104 and target ledgers 102 and the characteristics of the relationships. Still further, an NFT or collection of NFTs may represent a portion of a hierarchical arrangement of ledgers, or an entire tree of ledgers. Other arrangements of ledgers beyond trees are also contemplated including graphs (e.g., directed acyclic graphs, etc.), matrices or tables, linked lists, or other linking relationships among ledgers.

In an example embodiment, system 500 has a smart contract 522 associated with block N 514 of the primary ledger 104 and the smart contract 522 is capable of receiving ledger parameters. Smart contract 522 could relate to any block of the primary ledger 104. Thus, any block on the primary ledger 104 may include a reference to any number of smart contracts (on the same ledger or a different ledger) and/or NFTs. Further, a smart contract with the same functionality or different functionality of smart contract 522 could exist within a block and/or node of the target ledger 102 to allow it to act as its own primary ledger. Smart contract 522 is capable of receiving a ledger request comprising target ledger 102 parameters. Target ledger 102 parameters define the nature of the ledger to be created or otherwise instantiated by defining information such as genesis block 502 information, type of ledger, owner, purpose, metadata, etc. The target ledger 102 parameters may be provided by any smart contract input source 116 (e.g., a user device, an oracle, a smart contract, a management dashboard, etc.), or a combination thereof.

Smart contract 522 may be configured to instantiate, directly or indirectly, and/or maintain a target ledger 102. Smart contract 522 may create or instantiate a target ledger 102 after receiving valid input by generating, on the primary ledger 104, at least one digital token representing a target ledger 102 based on received target ledger 102 parameters. The received target ledger 102 parameters can be defined as necessary for the intended smart contract 522 functionality or application.

When a target ledger 102 is instantiated, the smart contract stored in a block or node of the primary ledger 104 that is being used to facilitate the instantiation of the target ledger 102 may be used to conduct error handling for the instantiated target ledger 102. In an embodiment, a different smart contract is used for error handling than the one used to facilitate the instantiation of the target ledger 102, such as a different smart contract associated with the primary ledger 104, or a smart contract associated with the target ledger 102. Error handling may include detecting, diagnosing, and/or resolving errors that occur during the execution of a program (e.g., smart contract). For example, a smart contract may be able to instantiate a target ledger 102 given a set of parameters, if the parameters are invalid or insufficient, an error may occur. Errors might occur due to inputs (e.g., incorrect target ledger instantiation parameters), hardware failures (e.g., one or more nodes in a blockchain are offline), network failures, software bugs, or an unexpected output (e.g., genesis block or some initial transactions on the blockchain do not have the expected values associated with the software objects). Thus, a smart contract may be used to detect and/or diagnose errors. In an embodiment, an NFT can be used to detect if an error has occurred (e.g., comparing one NFT to another NFT, comparing an NFT to transactions on a target ledger, etc.).

In an embodiment, once an error is detected, the same or different smart contract used for detecting the error may be used to handle the errors. Handling errors may include burning one or more NFTs, turning a ledger off, not turning a ledger on, rebuilding a target ledger using an NFT on the primary ledger, alerting one or more users, not allowing a smart contract to be used anymore, updating a database, scrubbing input, reformatting input, transferring an NFT to a different wallet address, minting one or more NFTs, etc. In an embodiment, error handling occurs before a target ledger 102 is instantiated and/or after a genesis block 502 has been instantiated. Smart contracts may be configured to handle errors with and/or without the use of NFTs that have been minted. In an embodiment, error management is based on the consensus of computing nodes of the blockchain network and therefore requires more than one computing node to determine if an error exists. In an embodiment, there are different error tiers and depending upon the error tier, more or less action may correspondingly occur (e.g., no action taken, warning action taken, corrective action taken, destructive action taken, etc.).

Once the digital token representing the target ledger 102 has been generated (e.g., created, instantiated, populated, etc.), smart contract 522 mints the digital token as a set of one or more NFTs 524 to represent the target ledger 102 on the primary ledger 104. In an embodiment, the same or different smart contract can be used for the steps of minting an NFT or doing any other functionality that a smart contract is capable of achieving. If a separate smart contract is used for minting the NFT or performing any other functionality that a smart contract is capable of achieving, the smart contract may be stored and/or referenced by a transaction that is in the same or separate block as the smart contract 522 that generated the digital token. For simplicity, a select few number of smart contracts are shown in system 500 and the other FIGS.

Further, for simplicity, a single NFT 524 is depicted as being minted from the smart contract 522 in the example embodiment within system 500. In an embodiment, the NFT 524 may be minted at the same block as the smart contract stored and/or referenced in (e.g., Block N 514) or any subsequent block (e.g., block N+1 516). In an embodiment, a set of minted NFTs created (generated, instantiated) from smart contract 522 may not all be minted in the same block (e.g., some NFTs may be minted in Block N+1 516 while some are minted in Block N+2 518). In an embodiment, a smart contract other than smart contract 522 is used to mint the digital token as a set of one or more NFTs to represent the target ledger 102 on the primary ledger 104. The minted NFTs may represent at least some of the target ledger 102 parameters, comprise a pointer to the instantiated target ledger 102, etc.

Further, after the digital token representing the target ledger 102 has been generated, smart contract 522 is used to instruct at least one computing node (computing node of the primary ledger 104 and/or a computing node associated with the target ledger 102 to be created (e.g., a hospital might have a server setup with a ledger agent waiting for instructions to create the new target ledger 102)) to instantiate the target ledger 102 in at least one node memory according to the target ledger 102 parameters (e.g., genesis block information, observer node information, etc.). The computing node may then instantiate a genesis block 502. In an embodiment, a smart contract other than smart contract 522 is used to instruct at least one computing node to instantiate the target ledger 102 in at least one node memory according to the target ledger 102 parameters. In an embodiment, the target ledger 102 is instantiated in at least one node memory according to the target ledger 102 parameters and at least one ledger management service smart contract 510 is also instantiated and coupled with the target ledger 102 according to the target ledger 102 parameters. In an embodiment, the at least one computing node is a computing node of the primary ledger 104 and of the target ledger 102. In an embodiment, the at least one computing node is a node of the target ledger 102 and is not a node of the primary ledger 104 (e.g., the target ledger node is private, semi-private, etc.). In an embodiment, an observer node is established when a target ledger 102 is created. An observer node may be a node that does not contribute to the consensus of a blockchain network and may retain a copy of the blockchain. In an embodiment, an observer node is used to watch the target ledger 102 and ensure that the target ledger 102 is not changed.

System 500 displays an embodiment where the NFT 524 minted from smart contract 522 is owned by the owner of wallet A 526 (person, entity, machine, etc.) and includes a pointer to the genesis block 502 of the instantiated target ledger 102. In an embodiment, a pointer of NFT 524 may point to another block of the instantiated target ledger 102. In an embodiment, when the target ledger 102 changes ownership or location, the pointer included within NFT 524 is updated. Since data of a file that was subject to a transaction is not always stored on a ledger (e.g., the transaction details may be what is stored on a ledger), in an embodiment, NFT 524 points to data that is stored off of the primary ledger 104, thereby pointing to where the data is stored and not only the target ledger 102.

In system 500, the genesis block 502 also includes a pointer to NFT 524. In some embodiments, a genesis block 502 of a target ledger 102 may not include any pointers back to the primary ledger 104 or an NFT 524 on the primary ledger. In some embodiments, the genesis block 502 may point to one or more NFTs in a set of NFTs on primary ledger 104. Yet, in some embodiments, other blocks, NFTs, etc. of the target ledger 102 may point to blocks, NFTs, etc., on the primary ledger 104. Pointers may be useful for performing validation tests, error handling, on-chain analytics, pointing to where data is stored (e.g., some data may not be stored on-chain because it is large or may be changed over time), pointing to where newly created blocks are (e.g., blocks with corrected data, more up-to-date data), associating transactions, blocks, and/or ledgers with other transactions, blocks, and/or ledgers, etc.

In an embodiment, the genesis block 502 may comprise a block version number (e.g., to identify the version of the block structure being used), a timestamp, a block height (e.g., identifying the genesis block and that it is the first block in the ledger), a merkle root (e.g., set to a default or null value), a nonce, a difficulty target (e.g., set to a low value, zero, or another value capable of setting the difficulty for mining a block), consensus mechanism, and/or an initial coin distribution (e.g., to record the allocation of tokens for the blockchain). Depending on the target ledger 102 use case for a genesis block 502 that is to be instantiated, a particular set of parameters may be used by a smart contract, service, configuration file, etc. that is used when generating a genesis block 502. As an example, when a target ledger 102 is being created for a hospital, the genesis block 502 may have a different specified difficulty target than a blockchain that would have more or fewer nodes and/or be proof of work or proof of stake.

In an embodiment, during the creation of a target ledger 102, a name service or URL system may be constructed for the target ledger 102. The name service may be an internal (intranet) name service or may be an external (internet) name service. The name service may be capable of allowing a browser to access a web3 NFT. For example, one may be able to access an NFT through a web browser by going to a URL of "web3://<NFT>". The name service may be based on the Ethereum standard ERC-4808, or a similar standard on the Ethereum blockchain, or any other blockchain or digital notarized ledger with similar capabilities.

In an embodiment, smart contract 522 or a different smart contract may be used to instantiate (create) genesis blocks for other target ledgers, perform copy transactions associated with the target ledger 102 or another target ledger, perform a migration transaction using the target ledger 102 or another target ledger, etc.

Once a smart contract 522 has created (instantiated) a genesis block 502 in a node of a target ledger 102, the same smart contract (e.g., smart contract 522) or a different smart contract may instruct the at least one computing node to enable transactions on the target ledger 102.

In an embodiment, the same smart contract 522, a different smart contract, and/or an NFT (e.g., NFT 524) may be used to validate the instantiation of the target ledger 102. In an embodiment, a smart contract 522 may validate the instantiation of the target ledger 102 before minting the set of one or more NFTs to represent the target ledger 102, after minting the set of one or more NFTs to represent the target ledger 102, before transactions are enabled on the target ledger 102, after transactions are enabled on the target ledger 102, or after a test transaction has occurred on the target ledger 102, etc. In an embodiment, a successful or unsuccessful validation of the target ledger 102 instantiation may be recorded as a transaction of one or more NFTs on the primary ledger 104 (e.g., NFTs representing the target ledger, NFTs representing a regression test, etc.). In an embodiment, the validation comprises the execution of a suite of regression tests such as Unit tests, check sums, timing tests, hash value tests, compliance tests, etc. Thus, validation tests may be used to perform functional testing to ensure that the target ledger 102 works as intended (e.g., smart contracts have been instantiated correctly, genesis block 502 has been correctly instantiated, an NFT (e.g., NFT 524) representing the target ledger 102 as an asset on the primary ledger is minted with the correct information, etc.). Validation tests may also ensure that an NFT is properly updated when a state change of the target ledger 102 occurs so validation may occur as to whether components are properly integrated. In an embodiment, validation tests test software performance such as how quickly operations (e.g., adding a block to the blockchain, minting an NFT, burning an NFT, execution time of a smart contract, etc.) are performed.

One or more ledger management services are further shown to be instantiated by the smart contract 522 after the target ledger 102 genesis block 502 is instantiated and the target ledger 102 is turned on. A ledger management service is intended to help with managing the target ledger 102, such as with monitoring, inventorying, logging, alerting, reporting, recovery, security, etc. In an embodiment, the at least one ledger management service operates on the primary ledger 104 or on the target ledger 120. In an embodiment, a ledger management service smart contract 510 operates on the primary ledger 104, on the target ledger 102, and/or may be used to manage the same or different target ledgers. In an embodiment, shown in system 500, the at least one ledger management service comprises a management service smart contract 510 (management service smart contract 510 represents one or more management service smart contracts) stored at a node of the target ledger 102. In an embodiment, the at least one ledger management service comprises at least one of the following ledger services: a ledger name service, an SNMP agent (e.g., OpenNMS, etc.), a cryptocurrency service, a target ledger digital token service, a ledger-to-ledger data exchange service, MILARRS (this feature is described in U.S. Pat. No. 8,504,740, "MILARRS Systems and Methods," filed on Jun. 12, 2012, the content of which is incorporated herein by reference in its entirety), etc. Further, the management service smart contract 510 illustrates that a smart contract stored on the target ledger 102 or a node of the target ledger 102 can be used by a target ledger 102 node to conduct transactions, such as transaction 512, and any other programmed operations.

In an embodiment, a management system and/or dashboard may be used for monitoring the target ledger 102. A management system and/or dashboard may allow for one or more users or machines to manage a ledger. OpenNMS or a similar network and monitoring system may be used to monitor event and fault management. For example, such tools may be used for monitoring network congestion, generating alerts when errors are detected, monitoring the performance of network nodes, and/or applying updates to nodes and configurations of ledgers, etc. Other features of present embodiments may be made capable by the disclosures of U.S. Pat. No. 11,405,268, "Fine grained network management to edge device features," filed on Feb. 22, 2021, the content of which is incorporated herein by reference in its entirety. Furthermore, features of present embodiments may be made capable by the disclosures of U.S. Pat. No. 11,020,668, "Distributed ledger tracking of event data," filed Sep. 24, 2020. The content of which is incorporated herein by reference in its entirety.

Figure 6:
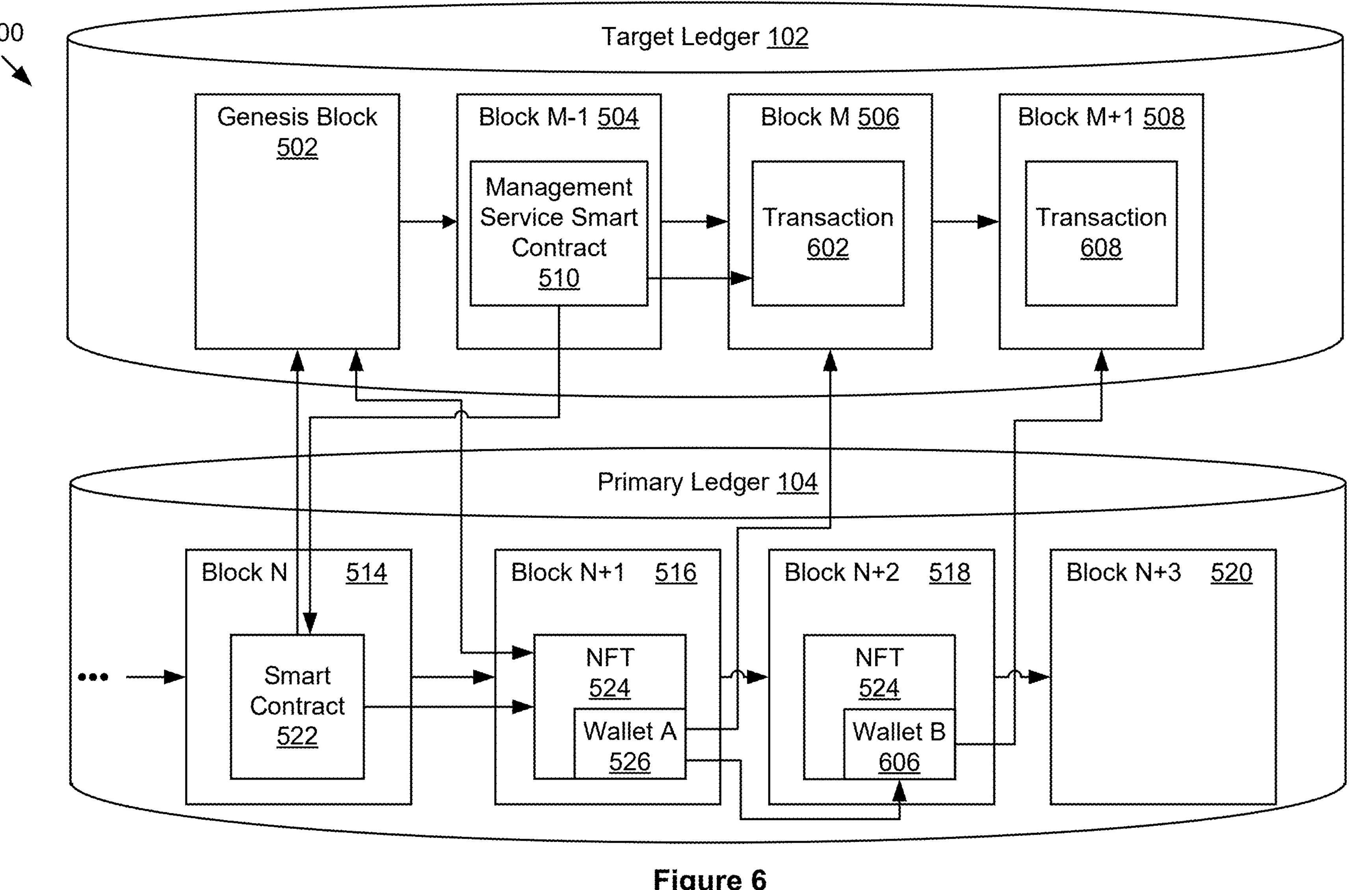
FIG. 6 illustrates a block diagram of a system according to an embodiment, in accordance with the present disclosure.

FIG. 6 illustrates a block diagram of a system according to an embodiment, in accordance with the present disclosure. System 600 includes a target ledger 102 and a primary ledger 104. The target ledger 102 and primary ledger 104 may be the same or a different set of ledgers than those seen in system 500. Further, the smart contract 522, management smart service contract 510, NFT 524, Wallet A 526, and ledger blocks 502, 504, 506, 508, 514, 516, 518, and 520 may be the same smart contracts, NFTs, wallets, and blocks, respectively as in system 500, but may be separate ones. For purposes of illustration, it can be assumed that the system and its components refer to the corresponding components from system 500 where the components are numbered the same. Thus, the explanation from system 500 can be incorporated into system 600 and the additional example embodiment information can be expanded upon below.

In an embodiment, after an NFT 524 is minted by smart contract 522 that may be representative of the owner of a target ledger 102 or representative of who can manage the target ledger 102, the NFT 524 may be transferred between owners.

In system 600, the NFT 524 representing ownership of the target ledger 102 is transferred from a first wallet A 526 to a second wallet B 606 to record who the owner of the target ledger 102 is. In an embodiment, the NFT 524 transaction may allow for the transfer of functionalities available to the owner of the NFT 524 (e.g., ledger feature NFT functionalities: a standardized layer, a monitoring agent, a read interface, a write interface, a cryptographic function, a name service, a ledger object namespace, a ledger object ontology, a healthcare agent, a financial agent, a gaming agent, a cache, a smart contract system, permission levels, authorized access, etc.). For example, an NFT 524 transaction may give particular access rights to the target ledger 102 (e.g., write capabilities, permissions, etc.) for the wallet address that has ownership of the NFT 524.

Regarding ownership transfer, system 600 depicts how one or more NFTs 524 can be transferred from a first wallet A 526 to a second wallet B 606 (e.g., via a call to the transfer( ) interface of a smart contract). The first transferor wallet A 526 may be owned or managed by the same person, entity, and/or machine as the second transferee wallet B 606. In an embodiment, the transferee is affiliated with the transferor. In an embodiment, the transferee has little or no connection to the transferor, other than the fact that an ownership transaction took place between them. The transfer of an NFT from one wallet to another may at least be recorded on the blockchain that the NFT is represented on. In system 500, the NFT 524 is represented on the primary ledger 104 and therefore when a transfer of the NFT 524 from wallet A 526 to wallet B 606 occurs, a corresponding transaction would be recorded in a block of the primary ledger 104. In the example depicted in system 600, the transaction occurs and is recorded in block N+2 518. For simplicity of illustrations, the transaction is not shown, instead, an NFT 524 in block N+2 518 is shown to be associated with wallet B 606. Further, smart contract 522 or another smart contract may be used when changing the ownership of the NFT 524. For simplicity of illustration, a smart contract is not shown as being used to transfer the ownership of the NFT 524.

Various other types of transactions can be recorded on the primary ledger 104 (and/or target ledger 102). In an embodiment, target ledger 102 operations can be recorded as a transaction on the primary ledger 104. In an embodiment, other transactions related to a set of NFTs existing on the primary ledger 104 that represent ownership or other aspects of the target ledger 102 may be recorded on the primary ledger 104 and/or target ledger 102. Thus, the target ledger 102 may be managed via recording or executing transactions associated with corresponding NFTs on primary ledger 104.

For example, at least one of the following types of transactions related to the target ledger 102 may be recorded: a minting transaction, an update transaction, a version transaction, an upgrade transaction, a ledger-to-ledger transaction, a copy transaction, a move transaction, a burn transaction, an ownership transaction, a target ledger state change. A target ledger 102 state change may signal that a target ledger 102 is turned on or off, and/or may record information about the functionality of the target ledger 102 (e.g., that it is used for storage, used as an index to stored data, it is used as a part of a file system, it is used as part of an OS stack, application specific uses, etc.). Another type of transaction that can be recorded on a ledger may comprise recording that a target ledger 102 was copied to a storage location, and/or that ledger data or pointer data was migrated, backed up, deleted, etc. Other types of transactions that could be recorded or used may also be recorded on the primary ledger 104 (and/or target ledger 102). Various transactions corresponding to functionalities offered from one or more smart contracts on the primary ledger 104 may be recorded on either ledger (e.g., via transactions associated with corresponding digital tokens).

Regarding access rights, depicted in the example embodiment of system 600 is that an NFT 524 may allow certain access rights to a target ledger 102. It is depicted in system 600 that the NFT 524 allows wallet A 526 to be used to perform particular transactions with the target ledger 102. For example, wallet A 526 may have the exclusive ability to write data to blocks of the target ledger 102 as long as wallet A 526 owns the ability to do so, the ability of wallet A 526 to do so being represented by NFT 524. Therefore, once wallet A 526 transfers the ownership rights of the NFT 524 to wallet B 606, wallet A 526 will no longer be capable of using NFT 524 to obtain access rights to write data to the target ledger 102, but wallet B 606 will now have the ability to do so. This example is represented in system 600 where after the NFT 524 is transferred to wallet B 606 sometime after wallet A 526 has ownership of NFT 524, then wallet B 606 has the ability to perform one or more particular actions on the target ledger 102 beginning at block M+1 508, when they obtained their ownership. In an embodiment, wallet A 526 obtains and transfers ownership to wallet B 606 in the same block of the primary ledger 104. In an embodiment, wallet B 606 may be capable of transacting within the same block of the target ledger 102 as wallet A 526 was if the block has not been written to the ledger yet. Thus, the separation of transactions into separate blocks has only been done for simplicity of illustration and is not intended to be limiting (as illustrated here and throughout the drawings).

Additional techniques that may be used to govern rights management via NFTs can be adapted from U.S. patent application Ser. No. 17/590,291 filed on Feb. 1, 2022, and Ser. No. 18/100,544 filed on Jan. 23, 2023, both to Witchey et. Al. and both titled "Token-Based Digital Private Data Exchange Systems, Methods, and Apparatus."

Since any feature that someone would find valuable to pay for, may be represented and used as a ledger feature NFT to be used with the target ledger 102 and/or primary ledger 104, embodiments described herein further allow for data on the target ledger 102 or referenced by the target ledger 102 to be represented by NFTs on the target ledger 102 and/or by NFTs on the primary ledger 104. Thus, the NFTs can be bought or sold, or otherwise managed in exchange for payment. As a result, the ownership of the important data can be bought, sold, recorded on the blockchain, verifiable, and include other important characteristics of NFTs and blockchains.

For example, because a target ledger 102 can be represented as an NFT, the claimed techniques allow for correcting mistakes on the target ledger 102. In an embodiment, a target ledger 102, as represented by one or more NFTs can be deconstructed, and then rebuilt from scratch if necessary to fix issues that exist on the target ledger 102. This provides an important solution to a problem with many blockchains where once data is recorded on the blockchain, it cannot be changed. For example, data may be stored on the blockchain in the form of an NFT, smart contract, or transaction and cannot be changed once recorded without the consensus of the blockchain or ledger nodes, where the nodes may be distributed around the planet. Such problems can be solved by the embodiments described because it would be possible for one or more smart contracts from the primary ledger 104 to be used to halt transactions on a target ledger 102, rebuild the target ledger 102 from scratch, or portions thereof, using the NFTs on the primary ledger 104 representative of the flawed target ledger 102 while replacing the flaws with corrections, minting one or more new NFT(s) for the new target ledger 102 with the same state as the old target ledger, enabling transactions on the new target ledger 102, and burning the NFT(s) representative of the old target ledger 102. This can be achieved because there is no requirement that target ledger 102 be stored on multiple, distinct nodes. Still, even in distributed embodiments, transactions associated with the NFT on the primary ledger 104 may be used to halt all operations of the target ledger 102 until it is reconstructed. Further, all target ledger 102 nodes may also participate in the reconstructions to ensure the data of the target ledger 102 maintains integrity, possibly by comparing newly established target ledger 102 blocks with old blocks. Even further, each node may "vote" or otherwise indicate their consensus of the progress (e.g., portion by portion, block by block, ledger as a whole, etc.) of rebuilding target ledger 102.

In an embodiment, a complete rebuilding of the target ledger 102 from one or more NFTs is not necessary, instead, the specific flawed portions of the target ledger 102 may be rebuilt. For example, NFTs on the primary ledger 104 can be minted to represent one or more smart contracts of a target ledger 102. In such an embodiment, the one or more smart contracts (represented as NFTs on the primary ledger 104) that are capable of being used by the target ledger 102, if flawed, can easily be replaced with new NFTs on the primary ledger 104 that represent corrected smart contracts for the target ledger 102 to use. Thus, the target ledger 102 does not need to be rebuilt with an embodiment that uses this approach to correct flawed smart contracts on the target ledger 102, instead the NFTs on the primary ledger 104 can be replaced with corrected NFTs representative of corrected smart contracts for use by the target ledger 102. Thus, the NFTs on the primary ledger provide an immutable indication of corrected flaws on target ledger 102.

Figure 7:
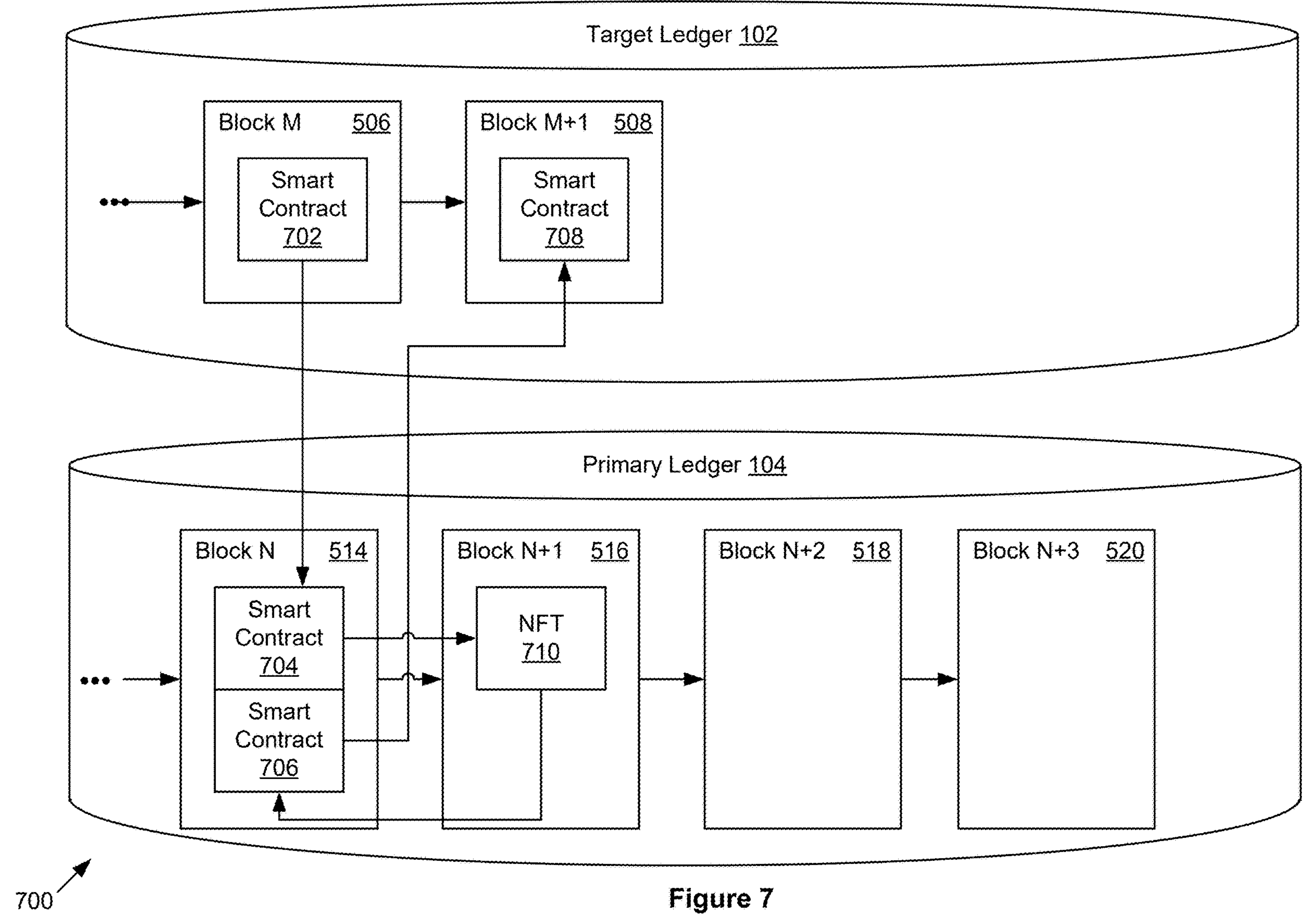
FIG. 7 illustrates a block diagram of a system according to an embodiment, in accordance with the present disclosure.

FIG. 7 illustrates a block diagram of a system according to an embodiment, in accordance with the present disclosure. System 700 further depicts how smart contracts may be used by either or both of the target ledger 102 and primary ledger 104.

In system 700, a smart contract 702 on the target ledger 102 causes a smart contract on the primary ledger 104 to be carried out. Smart contract's 702 output may be caused by various reasons that depend on the implementation of logic included within the smart contract 702. Although smart contract 702 is shown to only have one output, system 400 has already described how smart contracts may have more than one input and may have more than one output; an output that can cause or enable one or more computing nodes in the ecosystem to take action. Thus, any of the smart contracts in system 700 may require more than one input, may produce more than one output, and may rely on various combinations of input.

As a result of smart contract 702 from the target ledger 102 sending output to smart contract 704 on the primary ledger 104, smart contract 704 may then generate an NFT 710 which can be used as input to a smart contract 706 on the primary ledger 104 to support the instantiation of a set of one or more smart contracts 708 on the target ledger 102. In an embodiment, the smart contract 704 on the primary ledger generates an NFT on the target ledger 102. In an embodiment, a smart contract on the target ledger 102, mints an NFT that is then used with a smart contract of the primary ledger 104. Thus, it is illustrated that operations on the primary ledger 104 can allow for instantiating smart contracts at one or more nodes of a target ledger 102. Further, smart contracts recorded on the target ledger 102, either created from the primary ledger 104 or not, can allow for supporting transactions associated with the target ledger 102 for use by the primary ledger 104 as shown by the connection between smart contract 706 and smart contract 708. In an example, smart contract 708 can be used by the primary ledger 104 to conduct transactions on the target ledger 102. In an embodiment, smart contract 708 is created from the primary ledger 104 and then used by the target ledger 102 to conduct transactions on the primary ledger 104, or target ledger 102.

Figure 8:
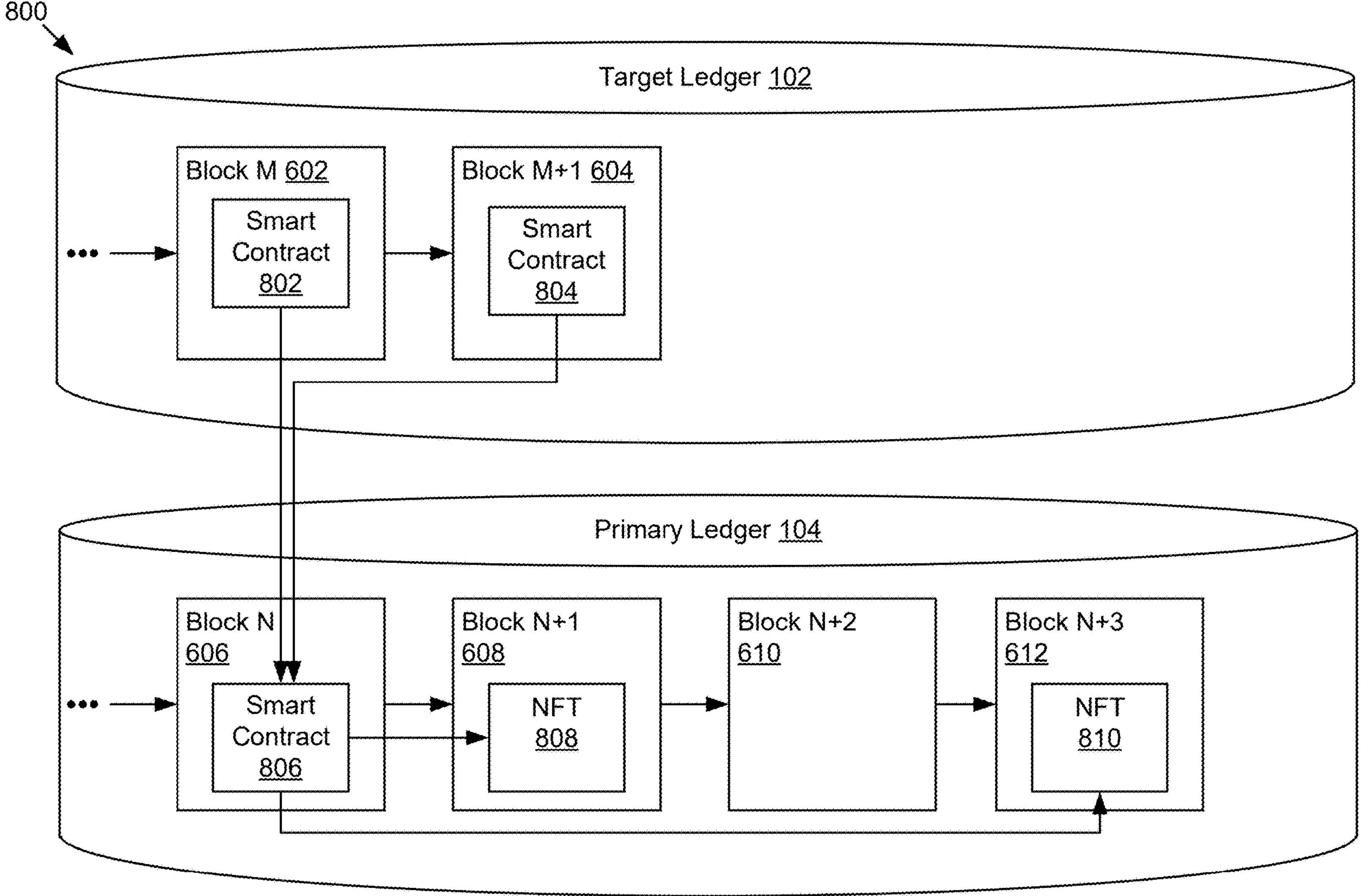
FIG. 8 illustrates a block diagram of a system according to an embodiment, in accordance with the present disclosure.

FIG. 8 illustrates a block diagram of a system 800 according to an embodiment, in accordance with the present disclosure. System 800 illustrates how various smart contracts on the target ledger 102 may be used to interact with smart contracts on the primary ledger 104.

System 800 illustrates that output from multiple smart contracts 802 and 804 on the target ledger 102 that may be used as input to a smart contract 806 on a primary ledger 104. A smart contract 806 associated with the primary ledger 104 may then cause an NFT 808 to be minted that records information relating to the target ledger 102, such as important information on or about the target ledger 102 (e.g., ledger owner, ledger parameters, ledger genesis information, ledger permissions, important transaction information recorded in a block of the target ledger 102, etc.). The same smart contract 806 is then depicted as minting another NFT 810 at a later point in time. Thus, it is possible for one or more smart contracts 806 stored on nodes of the primary ledger 104 to be used one or more times to mint one or more NFTs on the primary ledger 104. In an embodiment, one or more smart contracts 806 of the primary ledger 104 are used one or more times to mint one or more NFTs on the target ledger 102. In an embodiment, one or more smart contracts of the target ledger 102 are used one or more times to mint one or more NFTs on the target ledger 102 and/or primary ledger 104. Thus, through the use of such smart contracts and corresponding ledger tokens on primary ledger 104, smart contracts and/or NFTs may be used to manage target ledger 102.

FIG. 9 shows a flow diagram illustrating a method utilized by a computer-based digital notarized ledger management system, in accordance with the present disclosure. System 900 illustrates a ledger management system that uses a primary ledger to manage a target ledger.

In step 902, the primary ledger receives a ledger request comprising target ledger parameters. In an embodiment, the target ledger parameters define the nature of the ledger to be or instantiated (e.g., genesis block info, type of ledger, consensus technique if any, block structure, block linking technique, etc.).

In step 904, the primary ledger generates, via a smart contract, in the at least one memory, at least one digital token representing a target ledger based on the target ledger parameters. The generated ledger token can then become an NFT that is stored on the primary ledger and can be used to manage the target ledger. While the discussion provides NFTs (e.g., an ERC-721-like token) as an example, one should appreciate that other types of ledger tokens may also be used. Other types of ledger tokens that may be used could be ERC-20, ERC-1155, TRC-20, BEP-20, SPL, STP-20, NEP-5, WAVES, EOSIO, etc. Thus, one or more token standards may be used to mint and manage tokens on one or more blockchains or corresponding notarized ledgers.

In step 906, one or more NFTs are created (generated). The primary ledger may mint, according to at least one primary ledger smart contract, the at least one digital token as set of NFTs having at least some of the target ledger parameters and representing the target ledger on the primary ledger. In an embodiment, the target ledger parameters are not part of the NFT and are only used to create the digital token. Thus, the NFT used to instantiate the target ledger may include as much data about instantiating the target ledger as desired, or as little information as desired. For example, the NFT can include instantiation data possibly including version number of software used to instantiate the target ledger, instantiation parameters, owner data, or other ledger information.

In step 908, the primary ledger instructs at least one computing node to instantiate the target ledger in at least one node memory according to the target ledger parameters. In an embodiment, the computing node may be a same node that the primary ledger is using. In an embodiment, instantiating the target ledger includes instantiating a genesis block, as already described herein. Additionally or alternatively, instantiating the target ledger could include creating a ledger, copying a ledger, migrating a ledger, etc. In an embodiment, step 908 occurs before the minting of one or more NFTs that occurs in step 906.

In step 910, the primary ledger instructs the at least one computing node to enable transactions on the target ledger so that transactions may begin to be recorded in blocks on the target ledger. In an embodiment, a separate smart contract may be used by nodes of the primary ledger to enable transactions on the target ledger than were used for creating the target ledger.

Figure 10:
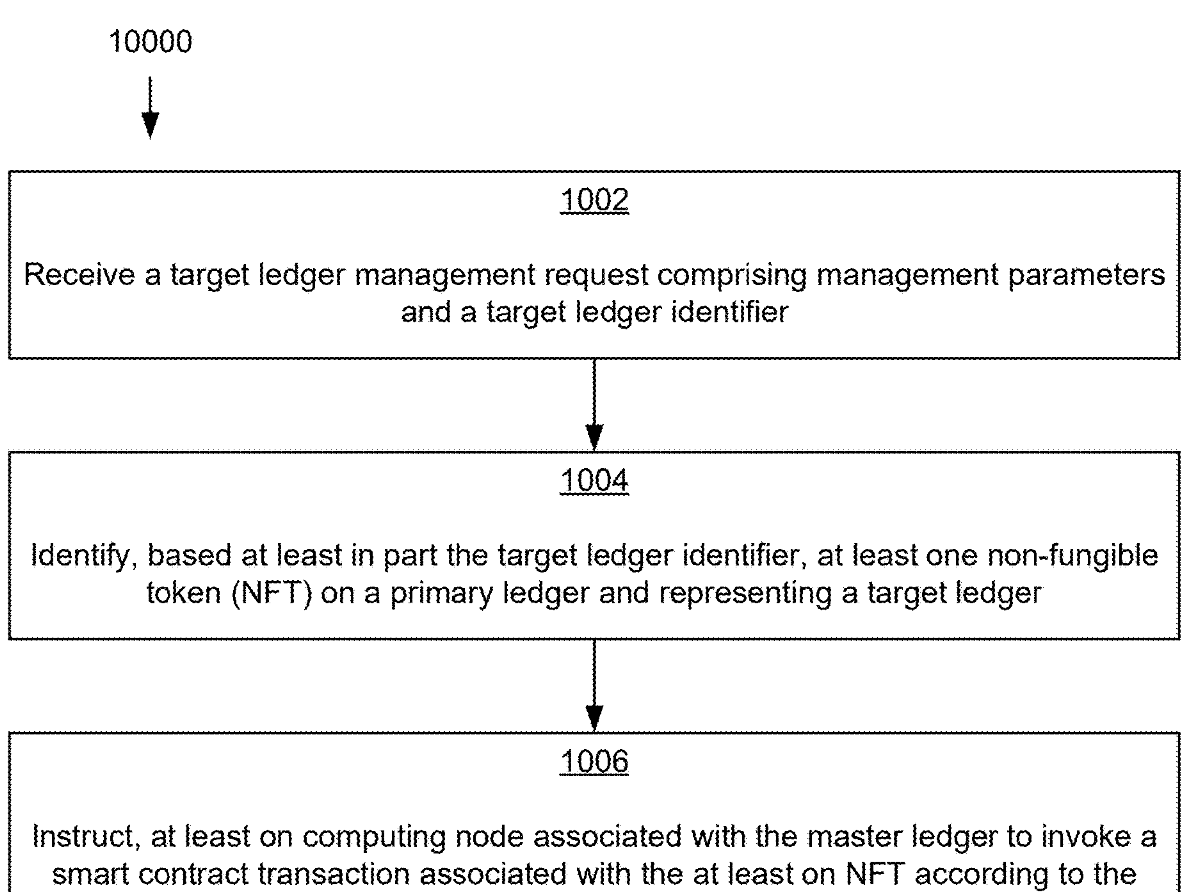
FIG. 10 shows a flow diagram illustrating a method utilized by a computer-based digital notarized ledger management system, in accordance with the present disclosure.

FIG. 10 shows a flow diagram illustrating a method utilized by a computer-based digital notarized ledger management system, in accordance with the present disclosure. System 1000 illustrates a method for managing a target ledger based on an NFT. The method may be used to manage a target ledger based on one or more NFTs.

In step 1002, a primary ledger may receive a target ledger management request comprising management parameters and a target ledger identifier. The parameters received may define the nature of the management operation (e.g., update, delete, deactivate, activate, pause, inventory, report, alert, etc.), etc.

In step 1004, the primary ledger may identify, based at least in part on the target ledger identifier, at least one NFT on a primary ledger and representing a target ledger. In an embodiment, the NFT may be identified based on which target ledger is being updated. In an embodiment, the target ledger may be identified based on which NFT is being updated. For example, the target ledger being updated (and the corresponding NFT that is being updated) may be identified based on which target ledger a transaction and/or state change is occurring on. An NFT may be updated during an ownership transaction and/or during a copy transaction. In an embodiment, more than one NFT is updated as part of this step. For example, multiple NFTs may be updated if the information to be updated pertains to more than one target ledger, block, NFT owners, and/or NFTs.

In step 1006, at least one computing node associated with the primary ledger is instructed to invoke a smart contract transaction associated with the at least one NFT according to the management parameters that were received in step 902. In other words, the corresponding smart contract associated with the primary ledger is being called/used to manage the target ledger.

Figure 11:
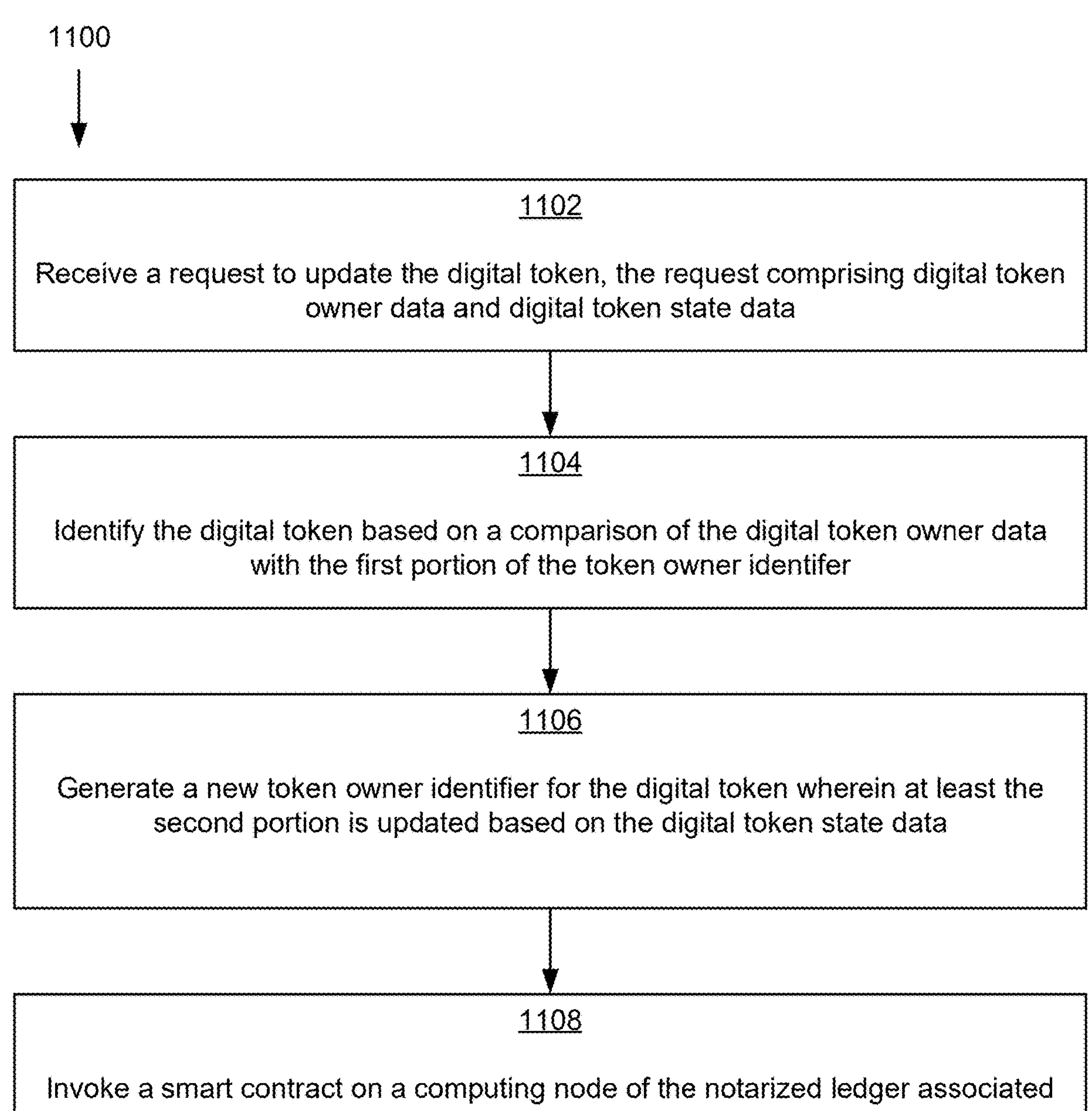
FIG. 11 shows a flow diagram illustrating a method utilized by a computer-based digital notarized ledger management system, in accordance with the present disclosure.

FIG. 11 shows a flow diagram illustrating a method utilized by a computer-based digital notarized ledger management system, in accordance with the present disclosure. The example embodiment illustrated in method 1100 describes a method of using NFTs to carry various combinations of information, and are not just limited to owner addresses and identifiers.

In an example embodiment comprising at least one computer-readable memory storing a digital notarized ledger, a digital token (NFT) associated with the digital notarized ledger, and storing software instructions; wherein the digital token comprises a token owner identifier, has a first portion representing an owner of the digital token, and a second, different portion representing a state of the digital token. As already described above, the data fields within an NFT can be used to also store information relating to other addresses, an address HOI, suffix, prefix, bit fields, etc. The system may also include at least one processor coupled with the at least one memory and that performs the following operations of method 1100 upon execution of the software instructions. In some embodiments, an entire address may be used to carry additional information via one or more bit fields. In yet other embodiments, custom addresses may be used. For example, a traditional NFT owner address may only have 256 bits, which may limit the number of bit fields that may be created or used for functional purposes beyond ownership. In such cases, a custom owner address may be established, possibly via one or more standards, having 512-bits, 1024-bits, 2048-bits, or other number of practical bits. One technical advantage of using bit fields from an owner address is the underlying notarized ledger infrastructure does not require modification to enable new functionality. Rather, the owner address can be considered to be "overloaded" with additional information, which can be processed via additional token management agents that may be off-ledger. Such agents may interpret the overloading information from the owner address according to the corresponding software instructions; processing each bit field, using bit fields via multi-bit tries to point to executable functions or lookup tables, triggering execution of functions, updating records, changing or recording state changes, or other causing the ledger nodes or other devices to take action.

At step, 1102, the processor may receive a request to update the digital NFT, the request comprising digital NFT owner data and a digital token state data. The update to the digital NFT may be representative of actions being carried out with respect to the target ledger that the NFT is representing. For example, the NFT may be updated when any transaction takes place on a target ledger, when a specific type of transaction takes place on a target ledger (e.g., a transaction representing minting of an NFT, a transaction associated with a specific smart contract, a transaction representing a change of ownership of an NFT or another asset (digital or not), a file being saved, a file being created, a file being deleted, a file being saved by a particular user, etc.). In some embodiments, other requests may use additional or alternative data to update any combination of bits in the NFT's bit field.

At step 1104, the method may identify the digital NFT based on a comparison of the digital NFT owner data with the first portion of the NFT owner identifier. In such an embodiment, the first portion of the NFT bit field is used to store the NFT owner data and is a way to identify the unique owner of the NFT. Therefore, the first portion of the NFT bit field that corresponds to the unique owner of the NFT may stay the same while a second (or any other possible number of bit fields) may be changed. For example, the owner may stay the same while the state data of an NFT may change.

A bit field of the NFT may be capable of representing possible states of a state machine, where the state represents the state of a target ledger and/or an operating system. The bit field may be updated based on updates or edits related to the target ledger (e.g., a block is added to the target ledger, transactions are added to the target ledger, the target ledger is turned on or off, the target ledger state changes, etc.). For example, the NFT address bit field may change for an NFT that is recorded on a primary ledger as the target ledger (represented by the NFT) adds transactions and/or blocks to the target ledger. Further, a bit field may be used to represent object identifiers of a block, transaction, ledger, wallet, smart contract, NFT, etc. Bit fields may also be representative of the permissions that an NFT may give to the address that the NFT is assigned to/owned by. Bit fields may represent how many times a target ledger has been rebuilt, that a bug fix or patch has been applied to an operating system, that a new directory was established in a file system, etc. The use of bit fields has also been described above with respect to FIG. 2.

In step 1106, the method may generate a new NFT owner identifier for the digital token wherein at least the second portion is updated based on the digital token state data. Similar to how the first portion owner data of an NFT may be changed independently of the second portion data of an NFT. The second portion of NFT data may also change independently of the first portion of the NFT data in some embodiments. For example, the owner identifier of an NFT might not change as the NFT changes states In such an example, the owner of the NFT stays the same and the state of the NFT is being updated in the second portion of the NFT bit field.

In step 1108, the method may invoke a smart contract on a computing node of the notarized/target ledger associated with the digital token according the new token owner identifier. In an embodiment, the smart contract may cause a transaction to be recorded on the notarized/target ledger with the token identifier having an old owner address or a new owner address with new state data. In an embodiment, the identifier can be an owner address, owner identifier, etc.

Figure 12:
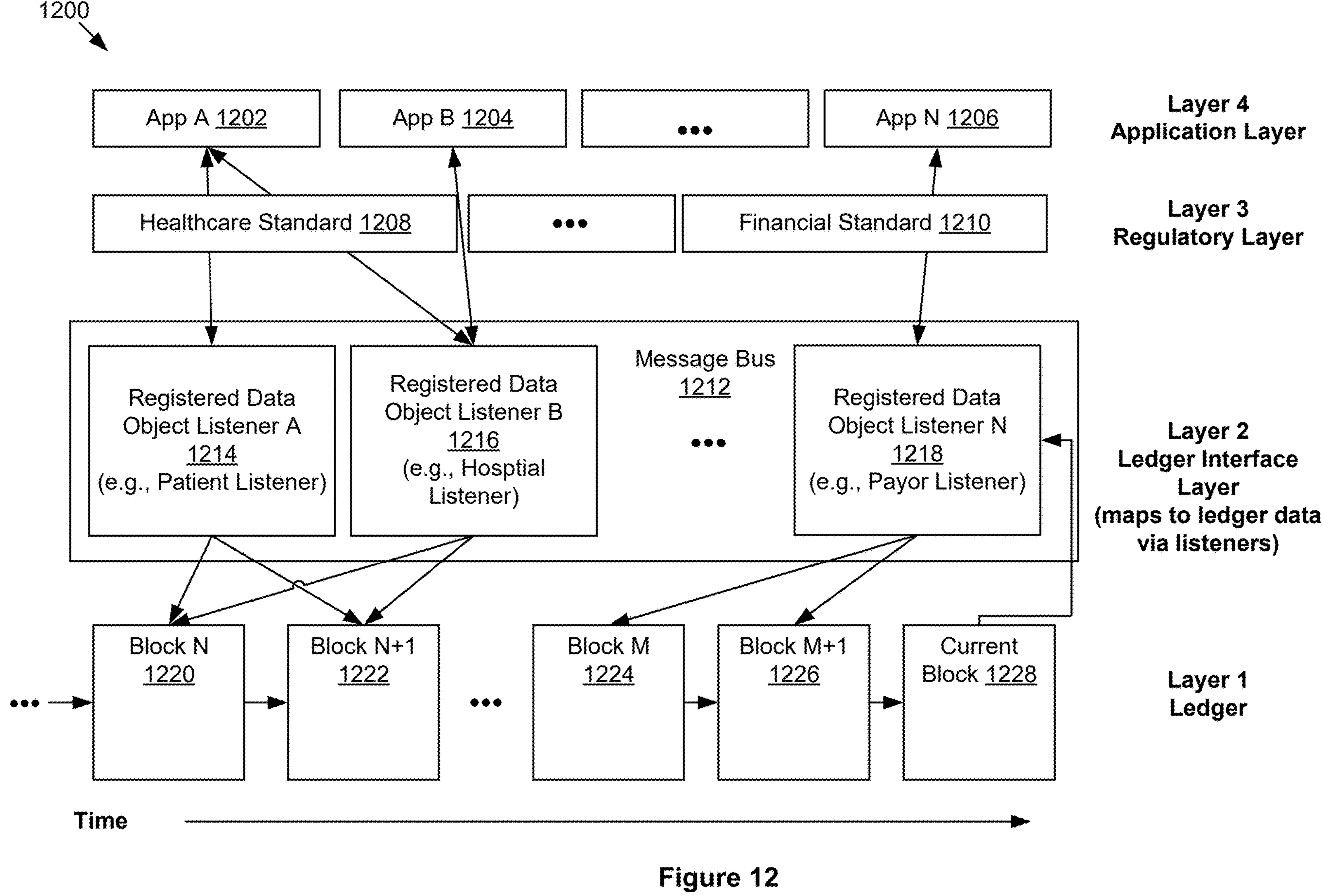
FIG. 12 illustrates a system that supports ledger interfacing, in accordance with the present disclosure.

FIG. 12 illustrates a system 1200 that supports ledger interfacing, in accordance with the present disclosure. Further, system 1200 may be used to create a ledger-based system architecture that can resemble a file system, an operating system, an application stack, a virtual machine instance, a container (e.g., Docker, Kubernetes, etc.) or other type of executable or storage system.

As time goes on, blocks may be added to each respective ledger layer in the ledger layers of system 1200. Further, it is possible that some ledgers are put into a state where they cannot add any new data blocks. That is to say, some ledgers in the layers of systems 1200 may not be capable of having data written to them but may have data read from them while the other ledger layers may be independently capable of reading and/or writing data from/to their respective ledgers.

System 1200 shows that in an embodiment, ledgers may have primary-target ledger relationships to cause multiple layers to be formed. Such layers may be organized in a way that is similar to the layered architecture of an operating system, for example. System 1200 shows a layer 1 ledger that includes blocks 1220, 1222, 1224, 1226, and 1228. Layer 2, can be representative of a ledger interface layer that is capable of mapping received message data to and from the layer 1 ledger via listeners, essentially allowing the layer to function as a message bus 1212. Such functionality may be obtained by using ledger feature NFTs as already discussed above. Layer 3 may be representative of a regulatory layer where standards exist, such as a healthcare standard 1208 (e.g., HIPAA, etc.), a financial standard 1210 (e.g., GAAP, etc.), etc. Layer 4 may be representative of an application layer where an application A 1202, application B 1204, application N 1206, and other applications reside. In one possible embodiment, each layer can reside on a respective ledger. In such an embodiment, it is possible to keep track of the complete version history and the transactions that have occurred on each layer. Nonetheless, other embodiments may be possible. For example, whereas layer 1 resides on a ledger, any or all of layers 2, 3, and 4 can be implemented using non-ledger technologies, such as using a centralized computing architecture. Thus, in an embodiment, a single ledger may exist in a stack of layers, wherein the other layers are implemented using non-ledger technologies and the single ledger-based layer may be read from and written to by one or more non-ledger layers. In an embodiment, once data is recorded as a transaction on a ledger layer, it cannot be overwritten. Therefore, it is possible to allow a ledger to behave similarly to a stack layer in an operating system stack or application system stack wherein intermediary services have the capability to read and write data from and to the ledger layer. As another example, in an embodiment, a single layer is capable of implementing a layered architecture by using NFTs and/or smart contracts with nested dependencies, for example.

Using the methods and systems described above, primary ledgers can instantiate target ledgers or otherwise form management relationships with target ledgers that allow for a layered architecture to be created, possibly where each layer and each component may be represented by one or more digital tokens (e.g., NFTs, composable tokens, collection tokens, etc.). In an embodiment, a first smart contract is used to instantiate the target ledger in at least one node memory according to the target ledger parameters (e.g., genesis block version number, timestamp, block height, difficulty target, ledger owner(s), ledger permissions, initial ledger data, maximum ledger size, when a ledger is turned on/off, transaction fees, primary ledger, etc.) further instantiates at least one application layer service that interfaces to the target ledger according to the target ledger parameters. In an embodiment, a second smart contract that may be different from the first smart contract instantiates at least one application layer service that interfaces to the target ledger according to the target ledger parameters. The interface between the at least one application layer service and the target ledger may be direct by calling the smart contract or target ledger APIs, or indirect via intermediary layers. In an embodiment, the application layer services comprise at least one of the following: an application specific layer, a regulated financial layer, a HIPAA compliant healthcare layer, a FIPS layer, a communication layer, a storage interface layer, a memory management layer (e.g., caching, buffering, paging, malloc( ) etc.), a device driver layer, a task scheduling layer, etc. In an embodiment where at least one application layer service is instantiated, an NFT may additionally be minted on the primary ledger representing the at least one application layer service. In an embodiment, the smart contract, or another smart contract, that is used to instantiate the target ledger in at least one node memory according to the target ledger parameters further instantiates at least one operating system service according to the target ledger parameters. Thus, in an embodiment, an NFT can be created for each layer of an OS-like architecture that memorializes how the ledger OS was built at a certain point in time, is being built, or is currently built.

System 1200 shows an embodiment of a ledger OS. For example, a ledger may be instantiated and maintained that is used to run applications such as enterprise applications. For example, a text editing application, spreadsheet application, slide deck creation application, drawing application, etc. may run on one or more application ledgers. The ledger could be used to record actions related to the applications and thereby monitor productivity and other obtainable metrics. In an embodiment, the application layer includes a ledger that allows one or more healthcare facilities (e.g., hospital) to record patient data (name, illness, treatment options, treatment data, etc.), healthcare decisions, and/or interactions (e.g., patient-doctor interactions, doctor-doctor interactions, facility-facility interactions, etc.). In an embodiment, an application layer level ledger is instantiated to track student records at a school. In an embodiment, a research and development application layer ledger is instantiated to record experiments and data obtained therefrom during the development of a drug. In an embodiment, a game studio or movie studio creates digital assets on an application layer ledger. Example techniques for recording healthcare translations that may be adapted for use with the inventive subject matter are described in U.S. Pat. No. 11,386,985 to Witchey titled "Healthcare Transaction Validation via Blockchain Systems and Methods," filed on May 13, 2019, the content of which is incorporated herein by reference in its entirety.

In an embodiment, an application ledger may be a target ledger to a regulatory layer ledger or to a layer 1 ledger. Thus, data included on the target ledger (e.g., application layer) can be represented by one or more NFTs on the primary ledger (e.g., regulatory layer). Further, the NFTs on the primary (e.g., regulatory layer) may be used by the target ledger(s) (e.g., application layer ledger(s)). Therefore, in an embodiment, NFTs stored on the primary ledger that are representing smart contracts can provide smart contract functions to be used by the target ledger. For example, in an embodiment, smart contracts stored on nodes of the regulatory layer may govern what information can be sent between ledgers (e.g., to and from applications on the application layer). In the regulatory layer, one or more application layer services may be created that maintain standards. The regulatory layer may store standards of communication and what data is allowed to be communicated, stored, obtained, etc. The regulatory layer may be used to facilitate conformance to regulatory requirements and/or protocols. For example, the regulatory layer may comprise a FIPS (Federal Information Processing Standards) layer, a HIPAA (health Insurance Portability and Accountability Act) layer, a HL7 (High Level 7) layer, a GAAP (Generally Accepted Accounting Principles) layer, a FINRA (Financial Industry Regulatory Authority) layer, GDPR (General Data Protection Regulation) layer, FCC (Federal Communications Commission) layer, a SOX (Sarbanes-Oxley Act) layer, etc. In an embodiment, a regulatory layer or portions thereof may be updated periodically to reflect changes in standards, protocols, and/or regulations. For example, as a tax code changes, the regulatory layer may change to properly reflect the changes in the tax code that should be implemented between the application layer 4 and the ledger interface layer 2. System 1300 and the accompanying description further show how the regulatory layer may set rules for communication between the application layer and the ledger interface layer.

In system 1200, the ledger interface layer is a primary ledger to the regulatory layer target ledger. The ledger interface layer, or any target ledger, may comprise at least one notarized ledger abstraction layer (NLAL) that can be used to communicate between layers, can facilitate the creation of NFTs on primary and target ledgers, and itself can be represented as an NFT.

In an embodiment, the ledger interface layer maps to a target ledger so that it can track changes to a target ledger (e.g., the ledger including application A 1202 on the application layer). In an embodiment, if a block is modified, a listener in the ledger interface layer may then point to a newly created block with changes or deltas (e.g., Block N+1). In an embodiment, a listener, such as registered data object listener A 1214 may listen to a single application layer service, such as application A. In an embodiment, a listener, such as registered data object listener B 1216 may listen to more than one application layer service, such as application A 1202 and application B 1204. In an embodiment, caches can be used to have the most recent data from a ledger available more quickly. Such caches may pre-cache read data from the ledger based on the executable code of the application. For example, if the executable code includes calls for high-use data (e.g., patient identifiers, financial data, etc.), the data can be read and cached before the call is made. The pre-cached data may then be available via the cache when the call is actually executed.

In an embodiment, application A 1202 uses a healthcare standard to interface with a registered data object listener A 1214 and a registered data object listener B 1216, each of which may be referred to as a ledger data monitoring agent. The ledger interface layer comprises at least one ledger data monitoring agent that watches for changes on the ledger and reports back or records data to the ledger when instructed. Application A 1202 and application B 1204 in the illustrated example embodiment are healthcare applications and therefore are using the healthcare standard 1208 that is defined on the regulatory layer. The registered data object listener A 1214 of the ledger interface layer is acting as a patient listener. As such, the registered data object listener A 1214 is listening only for specific events relating to a single patient. In an embodiment, the registered data object listener A 1214 may be listening for all patient-related data from application A 1202, not only a specific patient's data. Further, it is illustrated that a registered data object listener may listen to one or more applications to obtain data to eventually be managed by the layer 1 primary ledger. The registered data object listener B 1216 of the ledger interface layer is acting as a hospital listener. Thus, the registered data object listener B 1216 may be listening to all events that occur within a given hospital or to all events that occur relating to all hospitals. In another embodiment, a payor or other stakeholder may be the subject of a data object listener N 1218 so that data that the data object listener N 1218 is designed to listen for can be passed from the interface layer ledger and recorded to the layer 1 ledger.

As described in previous FIGS. and embodiments, the primary ledger may use smart contracts and/or NFTs to monitor actions being performed on a target ledger. The same functionality can be used in system 1200 to allow for the ledger interface layer to have a monitoring agent (registered data object listener) (e.g., a smart contract, a ledger feature NFT, etc.) wait for certain criteria to be triggered and cause data from the target ledger to be recorded as an asset on the primary ledger. Thus, any of the registered data object listeners in the ledger interface layer may take actions based on conditions or states in the OS ledger, regulatory layer, and/or application ledger. In an embodiment, registered data object listeners may have their state(s) controlled, such as being created, destroyed, activated, deactivated, etc. Listeners may be used for patient engagement, player engagement, student engagement, voter engagement, identify scaling issues, support read operations, support write operations, etc.

In an embodiment, the at least one ledger data monitoring agent writes data (e.g., embodying the data in an NFT) from an upper layer (e.g., Application layer 4) to the target ledger when a ledger data triggering criteria is satisfied. For example, registered data object listener A 1214 may wait for a condition to occur on the application layer relation to a patient P. Once a transaction occurs on the application ledger layer relating to patient P, then the registered data object listener A 1214 may use a smart contract to cause that data to be written from the application layer 4 to the layer 1 ledger at the most current block. One should appreciate that writing data to the ledger may only involve recording a transaction that the data is now available via a pointer where the data may be stored off ledger. It is also possible to store the data on the ledger but at a cost of increased ledger growth.

In an embodiment, the at least one ledger data monitoring agent sends ledger data to an upper layer (e.g., application layer 4) when the ledger data triggering criteria is satisfied upon data written to the target ledger. For example, a smart contract that is associated with layer 2 (e.g., ledger interface layer) or that is represented by an NFT on layer 2 or another layer is triggered to perform, then the registered data object listener A 1214 may cause data to be read from layer 1 and written to layer 4.

The above-described embodiments allow for ledger data to be assigned ownership, or the ledger as a whole to be assigned ownership and to be treated as an asset. For example, a patient in a medical setting such as a hospital may be given ownership of their data through the above-described systems. Example techniques of enabling a patient to own their data are described in U.S. U.S. patent application Ser. No. 17/590,291, Witchey et. Al. titled "Token-Based Digital Private Data Exchange Systems, Methods, and Apparatus" filed on Feb. 1, 2022, the content of which is incorporated herein by reference in its entirety. Further example techniques of enabling a patient to own their data are described in U.S. patent application Ser. No. 18/100,544 filed on Jan. 23, 2023, to Witchey et. Al. titled "Token-Based Digital Private Data Exchange Systems, Methods, and Apparatus," the content of which is incorporated herein by reference in its entirety. Further, a game studio or a film studio (see URL www.nantstudios.com for example) may be able to create a digital asset as an NFT or a specific instantiation of an asset as an NFT and give ownership to a client that paid for the creation of the asset of the specific instantiation of the asset while maintaining records and ownership relating to the asset creation and ownership. Thus, the above-described systems allow for a ledger to be instantiated and for a person or entity to be given control of that ledger and/or the data it includes at a later point in time. At the same time, the systems allow for transactions to be maintained on a ledger to record who owns what ledgers or who owns particular rights and abilities related to target ledgers.

Figure 13:
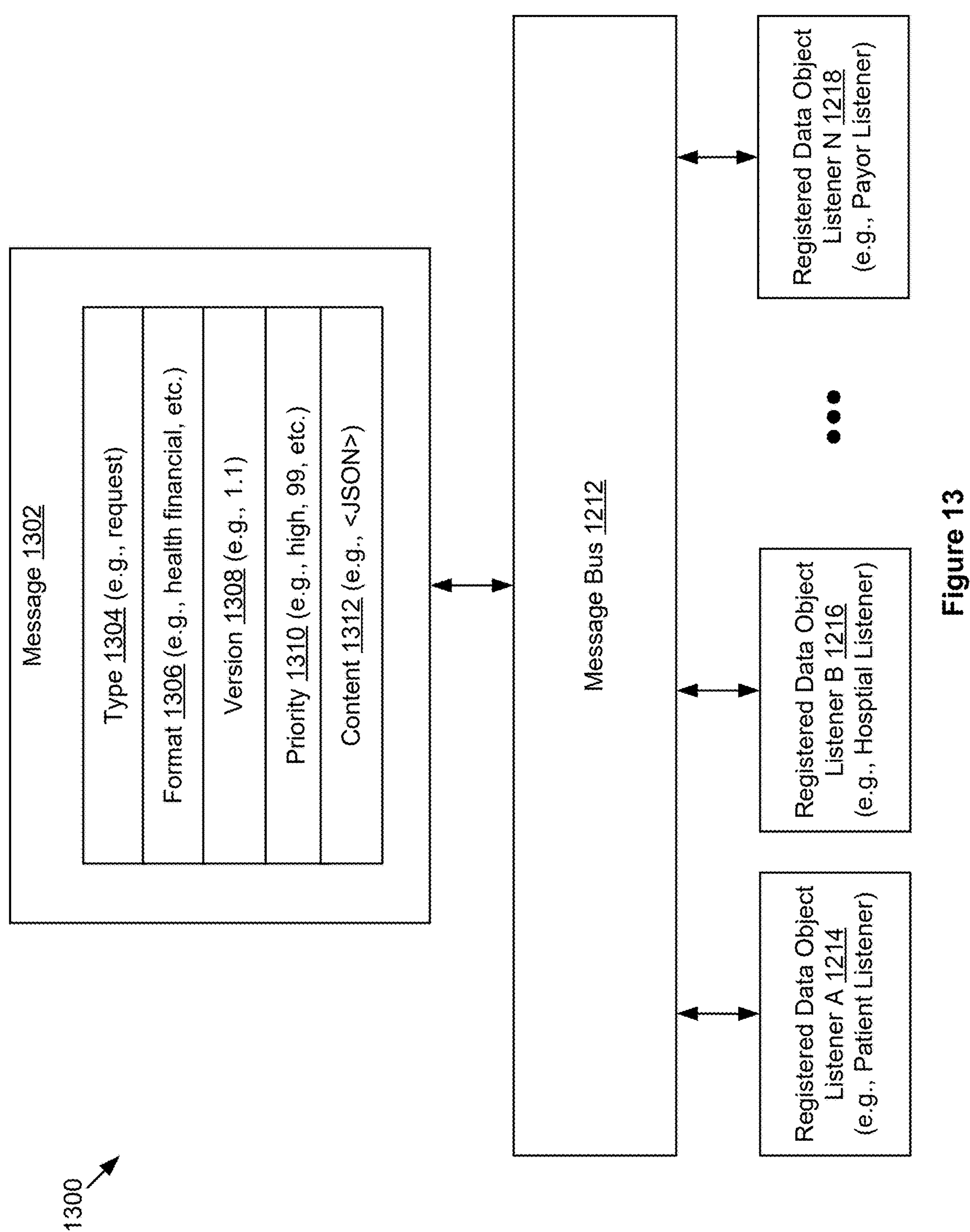
FIG. 13 illustrates a block diagram of a message bus, in accordance with the present disclosure.

The regulatory layer 3, and ledger interface layer 2 of system 1200 are described in more detail in system 1300 of FIG. 13.

In an embodiment, a system like the one shown in system 1200 may include a layer 0 storage layer. This may be useful in cases where the target ledger is intended to be used as a base storage system for an application or for an OS. In an embodiment, the layer 0 storage layer is part of an application, an operating system, a computing stack, a game, a computer-based financial system, a computer-based healthcare system, a communication stack, etc. In an embodiment, the target ledger may operate similarly to a tape drive (write once and read many times). Thus, an operating system or application may be configured to interact with the target ledger via a storage driver interface (e.g., a tape drive-like API, etc.). A tape drive-like API may allow for an application and/or operating system to perform write operations and read operations, IO control operations, seek operations, or other types operations. Since a target ledger is being used, the tape drive-like API may act as a write once and ready many times since the target ledger (acting as storage) may be immutable.

FIG. 13 illustrates a block diagram of a message bus, in accordance with the present disclosure.

The functionality of the message bus 1212 has already been described above with respect to system 1200. System 1300 shows in further detail the information that is passed to and from a message bus 1212 in an embodiment. In an example embodiment, the message bus 1212 may receive a message 1302 with various information from a target ledger. For example information such as message type 1304, format 1306, version 1308, priority 1310, and content 1312 may be passed to the message bus 1212 from a target ledger. In an embodiment, the fields included within the message 1302 are governed by a regulatory layer. The message bus 1212 can then use the received content to create an NFT on the layer the message bus exists on and/or may create an NFT on a ledger that is in a primary ledger relationship to the message bus ledger layer. In an embodiment, the message bus may create one or more NFTs based on the message it received from a target ledger. In an embodiment, the message bus may create and store one or more NFTs on the ledger layer it exists on and/or a ledger that is a target ledger in relation to the message bus 1212. In an embodiment, the message bus 1212 may further be capable of sending a message 1302 to a target ledger after a listener observes a change in data on one or more primary ledgers.

Figure 14:
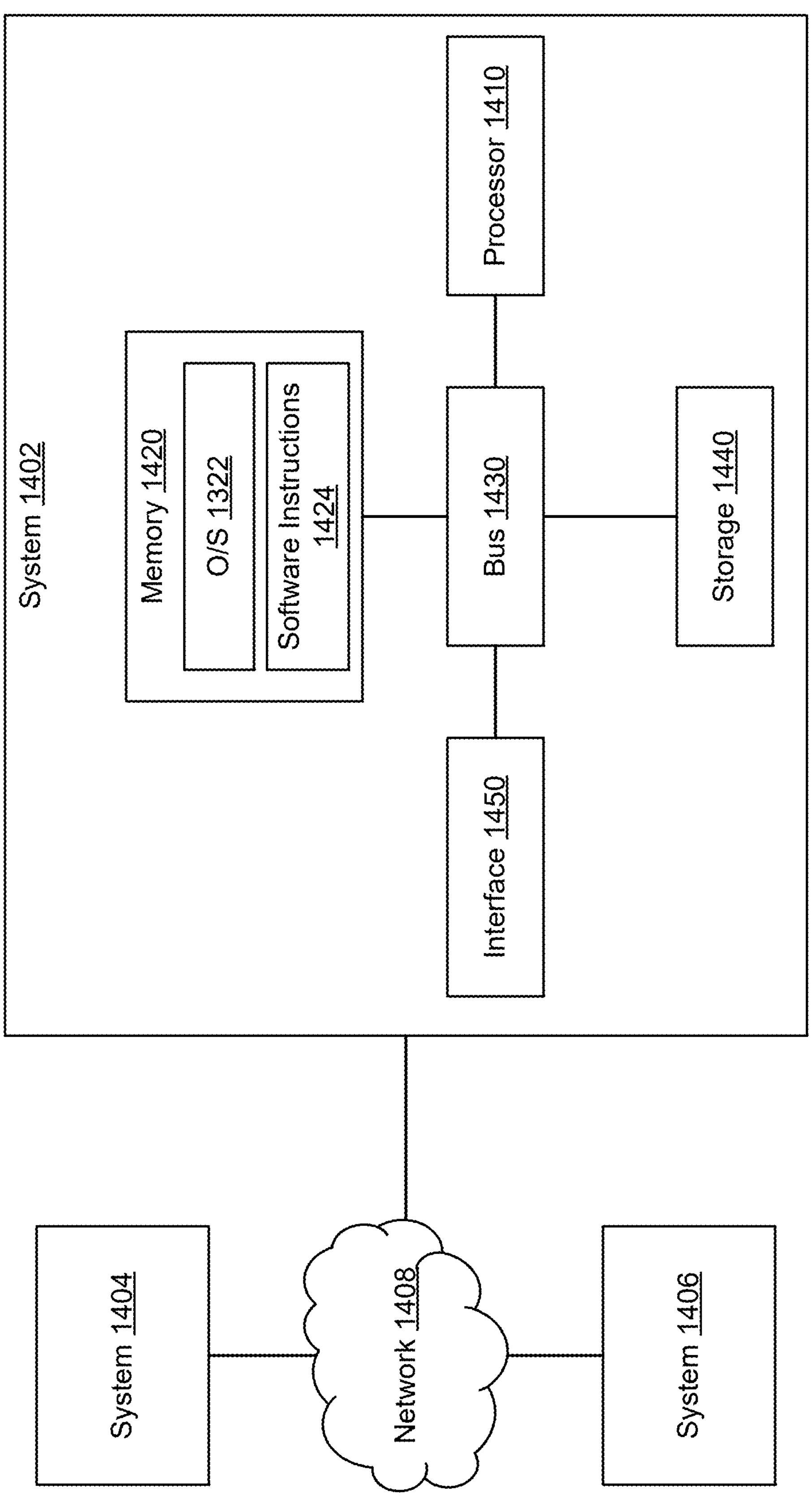
FIG. 14 is a block diagram of a distributed computer system usable to implement embodiments of the present disclosure.

FIG. 14 is block diagram of a distributed computer system 1400 usable to implement embodiments of the present disclosure. Various aspects and functions described herein may be implemented as hardware, software executing on hardware, or a combination of hardware and software executing on one or more computer systems. Aspects in accordance with the present disclosure may be located on a single computer system or may be distributed among one or more computer systems connected to one or more communication networks.

For example, various aspects and functions may be distributed among one or more computer systems configured to provide a service to one or more client computers, or to perform an overall task as part of a distributed system. Additionally, aspects may be performed on a client-server system, peer-to-peer system, or multi-tier system that includes components distributed among one or more server systems that perform various functions.

The distributed computer system 1400 of FIG. 14 includes three computer systems 1402, 1404, and 1406 (although a different number of computer systems is possible). The computer systems 1402, 1404, and 1406 can be operated by different entities and/or can be computing nodes of a notarized ledger system (e.g., blockchain network, hashgraph network, etc.). As shown, the computer systems 1402, 1404, and 1406 are interconnected by, and may exchange data through, a communication network 1408. The network 1408 may include any communication network through which computer systems may exchange data. To exchange data via the network 1408, the computer systems 1402, 1404, and 1406 and the network 1408 may use various methods, protocols, and standards including, among others, token ring, Ethernet, Wireless Ethernet, Bluetooth, NFC, TCP/IP, UDP, HTTP, FTP, SNMP, SMS, MMS, SS7, JSON, XML, REST, SOAP, CORBA IIOP, RMI, DCOM, and Web Services. The communication network may further employ one or more mobile access technologies including 2nd (2G), 3rd (3G), 4th (4G), 5th (5G) generation radio access for cellular systems, WLAN, Wireless Router (WR) mesh, and other communication technologies. Access technologies such as 2G, 3G, 4G, LTE, and future access networks may enable wide area coverage for mobile devices.

Computer systems 1402, 1404, and 1406 may include clients and servers. In various embodiments, to ensure data transfer is secure, the computer systems 1402, 1404, and 1406 may transmit data via the network 1408 using a variety of security measures including TSL, SSL, or VPN, among other security techniques.

Various aspects and functions may be implemented as specialized hardware or software executing in one or more computer systems including the computer system 1402 shown in FIG. 14. As depicted, the computer system 1402 includes a processor 1410, a memory 1420, a bus 1430, an interface 1450, and a storage system 1440. The processor 1410, which may include one or more microprocessors or other types of controllers, can perform a series of instructions that manipulate data. As shown, the processor 1410 is connected to other system placements, including a memory 1420, by the bus 1430.

The memory 1420 may be used for storing programs and data during operation of the computer system 1402. Thus, the memory 1420 may be a relatively high performance, volatile, random access memory such as a dynamic random access memory (DRAM) or static memory (SRAM). However, the memory 1420 may include any device for storing data, such as a disk drive or other non-volatile storage device, such as flash memory or phase-change memory (PCM). Various embodiments in accord with the present disclosure can organize the memory 1420 into particularized and, in some cases, unique structures to perform the aspects and functions disclosed herein. The memory 1420 may store program code of an operating system 1422 and software instructions 1424 for a TMP.

Components of the computer system 1402 may be coupled by an interconnection element such as the bus 1430. The bus 1430 may include one or more physical busses (for example, busses between components that are integrated within a same machine) and may include any communication coupling between system placements including specialized or standard computing bus technologies such as IDE, SCSI, PCI and InfiniBand. Thus, the bus 1430 enables communications (for example, data and instructions) to be exchanged between system components of the computer system 1402.

Computer system 1402 also includes one or more interfaces 1450 such as input devices, output devices and combination input/output devices. The interface devices 1450 may receive input, provide output, or both. For example, output devices may render information for external presentation. Input devices may accept information from external sources. Examples of interface devices include, among others, keyboards, mouse devices, trackballs, microphones, touch screens, printing devices, display screens, speakers, network interface cards, etc. The interface devices 1450 allow the computer system 1402 to exchange information and communicate with external entities, such as users and other systems.

Storage system 1440 may include a computer-readable and computer-writeable nonvolatile storage medium in which instructions are stored that define a program to be executed by the processor. The storage system 1440 also may include information that is recorded, on or in, the medium, and this information may be processed by the program. More specifically, the information may be stored in one or more data structures specifically configured to conserve storage space or increase data exchange performance. The instructions may be persistently stored as encoded signals, and the instructions may cause a processor to perform any of the functions described herein. A medium that can be used with various embodiments may include, for example, optical disk, magnetic disk or flash memory, among others. In operation, the processor 1410 or some other controller may cause data to be read from the nonvolatile recording medium into another memory, such as the memory 1420, that allows for faster access to the information by the processor 1410 than does the storage medium included in the storage system 1440. The memory may be located in the storage system 1440 or in the memory 1420. The processor 1410 may manipulate the data within the memory 1420, and then copy the data to the medium associated with the storage system 1440 after processing is completed. A variety of components may manage data movement between the medium and the memory 1420, and the disclosure is not limited thereto.

Further, embodiments of the present disclosure are not limited to a particular memory system or storage system. Although the computer system 1402 is shown by way of example as one type of computer system upon which various aspects and functions in accord with the present disclosure may be practiced, aspects of the disclosure are not limited to being implemented on the computer system. Various aspects and functions in accord with the present disclosure may be practiced on one or more computers having different architectures or components than that shown in FIG. 14. For instance, the computer system 1402 may include specially-programmed, special-purpose hardware, such as for example, an application-specific integrated circuit (ASIC) tailored to perform a particular operation disclosed herein. Another embodiment may perform the same function using several general-purpose computing devices running the operating system 1422.

The operating system 1422 may manage at least a portion of the hardware placements included in computer system 1402. A processor or controller, such as processor 1410, may execute an operating system which may be, among others, a Windows-based operating system (for example, Windows NT, Windows 2000/ME, Windows XP, Windows 7, Windows 8, Windows 10, Windows 100, or Windows Vista) available from the Microsoft Corporation, a MAC OS System X operating system available from Apple Computer, one of many Linux-based operating system distributions (for example, the Enterprise Linux operating system available from Red Hat Inc.), a Solaris operating system available from Sun Microsystems, or a UNIX operating systems available from various sources. Many other operating systems may be used, and embodiments are not limited to any particular operating system.

In various embodiments, processor 1410 and operating system 1422 together define a computing platform for which application programs in high-level programming languages may be written. These component applications may be executable, intermediate (for example, C# or JAVA bytecode) or interpreted code which communicate over a communication network (for example, the Internet) using a communication protocol (for example, TCP/IP). Similarly, functions in accord with aspects of the present disclosure may be implemented using an object-oriented programming language, such as Python, JAVA, C++, C# (C-Sharp), Solidity, or Vyper, among others. Other object-oriented programming languages may also be used. Alternatively, procedural, scripting, or logical programming languages may be used.

Additionally, various functions in accord with aspects of the present disclosure may be implemented in a non-programmed environment (for example, documents created in HTML, XML or other format that, when viewed in a window of a browser program, render aspects of a graphical-user interface or perform other functions). Further, various embodiments of the present disclosure may be implemented as programmed or non-programmed placements, or any combination thereof.

The methods and systems described in the present disclosure support multiple use cases. Below are illustrative non-limiting use cases.

In one use case, a healthcare facility uses a target ledger to store patient records. Such a system could allow for each individual patient's medical records to be stored on an individual blockchain which can then be represented by an NFT on a primary ledger. Such a use of the above-described systems would allow for each respective patient ledger (the target ledgers) to be represented as NFTs on the primary ledger. Such a system would further allow each patient to obtain more control over their medical data (the target ledger, represented by an NFT on the primary ledger). In an example, a hospital may treat a patient, instantiate a target patient ledger with the treatment records during the patient's stay, and then give control of the target ledger to the patient once the patient is checked out of the hospital. Parameters for instantiation of such a target patient ledger may include the node(s) that relate to the specific hospital where the patient is stating, a wallet address of the patient and/or care team that will be caring for the patient and will need to have access to ledger functionalities. The hospital may give control of the target ledger to the patient through an NFT that represents ownership and/or through changing where the ledger (and/or data referenced by the ledger) is stored. Further, the NFT may allow for each patient to have certain permissions with their respective patient target ledger, such as adding new transactions to the target ledger. Further, the target ledger might also be stored somewhere else once the patient is checked out of the hospital. Additionally, each medical facility may maintain a target ledger of more than one patient's data and a primary ledger is capable of compiling each of the facilities' data into one primary ledger while representing the data and/or ownership of the target ledger by one or more NFTs. Further, a healthcare ledger may be useful for insurance purposes. Thus, healthcare ledger data may be represented by one or more NFTs, the NFTs may be transferred to an insurance company (e.g., giving data access rights to the insurance company, giving data ownership to the insurance company, etc.) or may memorialize the data on the target ledger (and/or primary ledger) for any later auditing needs.

In a similar example, a patient ledger may include the information of more than one patient, such as including the treatment records for all patients at a certain location and/or having a certain type of healthcare condition. In this example, the certain location and/or condition type may then be represented on a target ledger and be capable of representing some or all the patient data, then a primary ledger can be used to compile data from all target ledgers. In such an example, the primary ledger may include data of healthcare facilities within a certain state, country, region, parent company, etc. and/or include certain treatment types so that each healthcare facility can control and own its target ledger data through an NFT on the primary ledger. Yet, the target ledger ownership can easily be transferred in situations where necessary such as when a healthcare facility is sold or patient data (or the like) on the target ledger (represented by an NFT) needs to be accessible by another healthcare facility (e.g., the patient is obtaining treatment from multiple locations).

In another example of how the above systems and methods may be used, a primary-target ledger relationship can be created between internet websites and their users. For example, a social media company may track (upon user agreement and authorization) each of its users' activities (e.g., visited pages, likes, friend requests, messages sent, etc.) in a target ledger as transactions. Each user may have their respective target ledger represented as an NFT on the primary ledger. In such an example, each user may then be given control over their personal data by the social media company so that users can edit their owned target ledger (e.g., rebuild the ledger with certain transactions missing/taken out) or delete their ledger or restrict the ability to access it through the use of an NFT owned by the user on the primary ledger. Such an example could allow for a blockchain environment to support the "right to be forgotten," possibly as part of Europe's GDPR privacy and security laws or California's CCPA laws.

In another example, retail stores could use the above-described systems and methods. Blockchains have many functional uses in a retail (or any supply chain) environment. A blockchain may be used to track which products are being stocked and sold at a location level, company level, regional level, brand level, area-within-the-store level, supplier level, etc. Further, a blockchain may be useful to track which suppliers a product has come from in order to track where the product has originated from (e.g., bananas are obtained from supplier A, who obtained from supplier B, who obtained from grower C). Any of the above-listed blockchains could be viewed as a target ledger and represented as an NFT on a primary ledger. Parameters for instantiation of such a target ledgers may include what the ledger purpose is so that particular smart contracts can be stored in one or more nodes of a target ledger for later use with transactions on the target ledger and/or primary ledger, what permissions are associated with one or more NFTs capable of being used to manage the respective target ledger, etc. . . . As such, NFTs could allow access for certain suppliers to add transactions to a target ledger, for example. Further, certain product metrics (e.g., sales, inventory stock, price, etc.) may be represented by an NFT on the primary ledger. In an example, certain suppliers or entities along the supply chain may have certain permissions (granted by an NFT on a primary ledger) for what they can do with a target ledger. In another example, the total itemized stock of one or more locations may be represented by an NFT on the primary ledger. In yet another, example, the supply chain of a product or group of products may be represented by an NFT and then stored on a primary ledger so that it can easily be reviewed at a later point in time (e.g., product recall for tainted produce). Such ledger data may also be valuable. The embodiments described herein would allow for a set of recorded data on the target ledger to be represented by an NFT on the primary ledger, which could then allow the data ownership to be transferred (representing product sales data as an NFT and transferring the ownership of the sales data to a second wallet).

In yet another example, a game, movie, digital asset studio, or the like, may instantiate a target ledger with data related to virtual products created by the studio (e.g., scenes, audio, objects, and other digital assets). The digital assets may then be represented by an NFT on the target ledger and/or the primary ledger so that ownership of the digital asset is known and transferable. The NFT may represent the algorithm or seed that was used to generate a digital asset so that the owner of the NFT is able to prove whether another digital asset is the same as the one represented by the owned NFT. Further, a complete target ledger may include digital assets, how the digital assets were made (e.g., seed value), and/or other transaction data that is added to a target ledger. The target ledger may then be represented by an NFT on a primary ledger, so that the target ledger may have ownership and/or access rights transferred. A target ledger, for example, may record a transaction, mint an NFT, and/or edit a field of an NFT each time a particular digital asset is used that is associated with the NFT. Such a configuration would allow for the history of use for particular digital assets to be recorded on a target ledger and/or primary ledger. In an example, a target ledger may be generated when a digital map/world is generated/initialized/instantiated and a world seed value is passed into the parameters for the genesis block of the target ledger.

In an example, a video game may maintain a ledger. For example, each time an item is traded, an NFT on the video game ledger may have its ownership changed. Additionally, other in-game elements may be represented by an NFT, such as in-game achievements, characters, levels, trophies, etc. The video game ledger may be treated as a target ledger to allow for the complete ledger to be represented as an NFT on a primary ledger, or to allow for certain data from the target ledger to be represented as an NFT on the primary ledger (e.g., an in-game item ownership change, in-game item, item customizations, item trades, currency trades, appearances, loot history, etc.). Thus, each asset could be represented by an NFT or an instantiation of an asset could be represented by an NFT. Thus, the video game's ledger may be treated as a type of intellectual property that can be managed, bought, sold, or otherwise governed via the corresponding NFTs on the primary ledger.

In an example, a ticket seller (e.g., arena, artist, team, theater, company, etc.) may maintain a ticket ledger. For example, each time new authorized ticket sellers are added for conducting tickets sales, an NFT on a primary ledger may have its ownership changed, may be burned, and/or may be minted to give ticket ledger (target ledger) related permissions to the new authorized ticket seller(s) so that they may facilitate the selling of tickets. As an illustration, arena A may have tickets available for each seat in the arena, and depending on the performer, group, or team that is using the arena on a given day where tickets are being sold for, the performer, group, or team (for example) may have certain agents that it uses to facilitate the sales of tickets and that agent may want the ability to write ticket sale transactions onto the ticket ledger. In an embodiment, a venue may maintain a primary ledger and desire to instantiate a target ledger that corresponds to each event at the venue so that the person(s) or entity that is using the venue is able to use the target ledger and the target ledger can be represented as an asset on the primary ledger, using an NFT (e.g., the target ledger may contain data on when tickets were sold, how much tickets were sold for, who tickets were sold to, prices of tickets sold, how many tickets were sold second-hand, etc.).

In an example, a target ledger may be instantiated to record voting records. The target ledger may then be capable of representing data relating to how many votes were cast, when votes were cast, and/or where votes were cast. A target ledger may be instantiated for a particular election, all elections within a city, all elections within a state, and/or all elections of a certain type (e.g., local government elections, presidential elections, school board elections, etc.). A target ledger may be turned off once an election has ended. Further, a target ledger with election information could be represented as an NFT on the primary ledger to record the results of the election and may allow for additional election transparency.

In an example, a school may instantiate a target ledger that records student records (classes taken, teachers, grades, attendance, meal balance, etc.). The target ledger may then be capable of representing certain data relating to a student as an NFT on a primary ledger and then give ownership of the NFT to the subject student or parent thereof to give them ownership of the selected data on the target ledger. In an example, the owner of a student record NFT is not able to do anything with the NFT besides view the history related to the NFT. In this way, the target ledger may be private, but the select data on the target ledger may be accessible to the NFT owner. In an example, a school may use a smart contract on a primary ledger to instantiate a target ledger yearly with such a combination of information (e.g., classes offered, students enrolled, teachers, grades, attendance, meals, etc.) and have the target ledger minted as an NFT at the end of every year and stored on the primary ledger before any prior NFTs of the yearly target ledger are burned and the target ledger is turned off.

In an example, a computer program or codebase may be represented by a target ledger. For example, the licenses, executions, versioning, commits, pulls, merges, etc. can be maintained on a target ledger and represented as NFTs on a primary ledger. As such the NFTs can be transferred to a different owner by transferring NFTs which may then allow a new owner to have digital ownership of represented data, code, or may further allow for the owner to have read and/or write permissions associated with the target ledger or code references to on the target ledger. In a similar example, a computer program or codebase may be a target ledger instantiated by a primary ledger smart contract and be backed up to the primary ledger (in the form of an NFT on the primary ledger that represents the target ledger) after a predefined or dynamic time interval.

Similarly, a research and development company may record all research and development activities (e.g., trials, results, formulations, etc.) on a target ledger related to the product being developed. In such a case, either before or after the product is fully developed, the research and development company may desire and be able to represent the entire target ledger or portions of its data as NFTs on a primary ledger so then the valuable data can be sold and/or ownership thereof transferred to a second owner. In an example, the NFT is not the primary asset being bought but is supplemental to the IP rights that are being bought. Such transfer of IP rights may be facilitated by the transfer of the NFT that represents a complete target ledger or select data on a target ledger.

In another example, as already discusses above, one or more ledgers may be used to represent an operating system. For example, certain layers of an operating system may be represented as an individual ledger layer. Thus, each layer may then record data to another layer through the use of NFTs. Such data that may be represented by an NFT may be versioning, productivity statistics, saves, application launches, etc. Such an example would allow for the versioning of each layer of an operating system to be memorialized independently of the other layers. Further, such a layered ledger architecture would allow for select data from one or more other ledgers to be recorded on one or more primary ledgers. Thus, such embodiments also allow for the controlled aggregation, ownership, and access rights for data on one or more ledgers.

Another example of a ledger use case may be for a target ledger that maintains new stories, received tips, reporter information, reported travel information, photos, videos, etc. Such pieces of data on a target ledger may be represented by NFTs on a primary ledger or on the target ledger itself (but facilitated by a primary ledger). Such a target ledger may be useful to verify the accuracy and/or authenticity of news stories. For example, a news article on a target ledger may be represented by an NFT on a target ledger (e.g., the target ledger is only for the news company that wrote the story and/or that has ownership of the ledger as could be represented by another NFT). The news story may then be represented by an additional NFT on a primary ledger and the ownership rights can be assigned to the owner of the target ledger (e.g., the news company that wrote the story and/or owns the target ledger). Such an example would allow for the authenticity of an article on the primary ledger to be checked against the target ledger from which it originated.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, utilized, or combined with other elements, components, or steps that are not expressly referenced. Where the specification or claims refer to at least one of something selected from the group consisting of A, B, C . . . and N, the text should be interpreted as requiring only one element from the group, not A plus N, or B plus N, etc.

What is claimed is:

1. A computer-based ledger interfacing system, comprising:

at least one non-transitory computer readable memory storing a primary notarized ledger and software instructions;

at least one processor coupled with the at least one memory and that performs the following operations upon execution of the software instructions:

receive a request to instantiate a software stack comprising a layered architecture;

instantiate a plurality of software layers in the at least one memory;

generate at least one digital token on the primary notarized ledger representing at least one software layer in the plurality of software layers, wherein:

the at least one digital token includes an address bit field having a first portion representing an owner of the digital token and a second portion representing a state of the at least one software layer in the plurality of software layers; and the plurality of software layers comprise a ledger interface layer configured to enable communications among the plurality of software layers, the ledger interface layer comprising one or more caches storing data received during the communications;

instantiate a target ledger associated with the at least one software layer and with the at least one digital token;

instantiate at least one smart contract associated the target ledger and representing the at least one software layer; and instantiate at least one data monitoring agent associated with the ledger interface layer;

enable recording transactions associated with the at least one software layer via the at least one data monitoring agent invoking the at least one smart contract; and responsive to a change in the state of the at least one software layer, update the second portion of the address bit field of the at least one digital token.

2. The computer-based ledger interfacing system of claim 1, wherein the at least one software layer comprises a regulatory layer.

3. The computer-based ledger interfacing system of claim 2, wherein the regulatory layer comprises at least one of the following regulatory standards: FIPS, HIPAA, HL7, GDPR, FINRA, FCC, SOX, or GAAP.

4. The computer-based ledger interfacing system of claim 1, wherein the ledger interface layer comprises a message bus enabling routing messages among layers in the plurality of software layers.

5. The computer-based ledger interfacing system of claim 4, wherein the message bus processes and records messages as the transactions and includes fields comprising at least one of the following: a message type, a format, a version, a priority, or a content.

6. The computer-based ledger interfacing system of claim 1, wherein the data monitoring agent comprises a registered data object listener that monitors events.

7. The computer-based ledger interfacing system of claim 6, wherein the registered data object listener monitors healthcare-related events.

8. The computer-based ledger interfacing system of claim 1, wherein at least one software layer includes at least one application layer.

9. The computer-based ledger interfacing system of claim 8, wherein each application associated with the at least one application layer has an associated digital token representing permitted operations.

10. The computer-based ledger interfacing system of claim 1, wherein the one or more caches each comprises a pre-cache of data based on requirements of the at least one software layer.

11. The computer-based ledger interfacing system of claim 1, wherein the at least one software layer implements write-once-read-many storage functionality with respect to the target ledger.

12. The computer-based ledger interfacing system of claim 1, wherein the at least one data monitoring agent comprises multiple data monitoring agents each monitoring different types of events.

13. The computer-based ledger interfacing system of claim 1, wherein the at least one digital token comprises at least one non-fungible token (NFT).

14. The computer-based ledger interfacing system of claim 1, wherein the at least one digital token comprises at least one of the following types of tokens implemented on the primary notarized ledger: a composable token, a set token, or a sub-token.

15. The computer-based ledger interfacing system of claim 1, wherein the plurality of software layers are included in an operating system stack.

16. The computer-based ledger interfacing system of claim 1, wherein the plurality of software layers are included in at least one of the following software stacks: an application stack, a computing stack, a game stack, a financial system stack, a file system stack, or a communication stack.

17. The computer-based ledger interfacing system of claim 1, wherein the address bit field of the at least one digital token comprises a third portion representing at least one of the following: an record identifier, an address, a health object identifier (HOI), a suffix, a prefix, a patient specific record, a ledger state, a URL, a pointer, a patient identifier, a hospital identifier, or a file system address.

18. The computer-based ledger interfacing system of claim 1, wherein the primary notarized ledger or the target ledger comprises at least one of the following types of ledgers: a blockchain, public ledger, a distributed ledger, a custom ledger, a hash graph, a direct acyclic graph, a centralized ledger, a torrent ledger, or a permissioned ledger.

19. The computer-based ledger interfacing system of claim 1, wherein the primary notarized ledger or the target ledger comprises a torrent stored in the at least one memory.

20. A computer-based ledger interfacing system, comprising:

at least one non-transitory computer readable memory storing a primary notarized ledger and software instructions;

at least one processor coupled with the at least one memory and that performs the following operations upon execution of the software instructions:

receive a request to instantiate a software stack comprising a layered architecture;

instantiate a plurality of software layers in the at least one memory;

generate at least one digital token on the primary notarized ledger representing at least one software layer in the plurality of software layers, wherein:

the at least one digital token includes an address bit field having a first portion representing an owner of the digital token and a second portion representing a state of the at least one software layer in the plurality of software layers; and the plurality of software layers comprise a ledger interface layer configured to enable communications among the plurality of software layers, the ledger interface layer comprising one or more caches storing data received during the communications;

instantiate a target ledger associated with the at least one software layer and with the at least one digital token, wherein the ledger interface layer comprises a notarized ledger abstraction layer (NLAL) configured to facilitate generation of digital tokens on the primary notarized ledger and on the target ledger;

instantiate at least one smart contract associated the target ledger and representing the at least one software layer; and instantiate at least one data monitoring agent associated with the ledger interface layer; and enable recording transactions associated with the at least one software layer via the at least one data monitoring agent invoking the at least one smart contract.

21. The computer-based ledger interfacing system of claim 20, wherein the at least one data monitoring agent is configured to send data from the target ledger to an upper layer in the plurality of software layers responsive to satisfying a triggering criteria upon data being written to the target ledger.

* * * * *